US010289589B2

(12) United States Patent
Chhor et al.

(10) Patent No.: US 10,289,589 B2
(45) Date of Patent: May 14, 2019

(54) APPARATUSES TO RESOLVE ROLES FOR DUAL ROLE SERIAL BUS DEVICES

(71) Applicant: Intel Corporation, Santa Clara, CA (US)

(72) Inventors: Michael T. Chhor, Hillsboro, OR (US); Reed D. Vilhauer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 15/253,336

(22) Filed: Aug. 31, 2016

(65) Prior Publication Data
US 2018/0060261 A1    Mar. 1, 2018

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01)

(58) Field of Classification Search
None
See application file for complete search history.

(56) References Cited

U.S. PATENT DOCUMENTS 7,506,082 B2    3/2009 Kim
10,114,782 B2 *  10/2018 Kulkarni ............... G06F 13/385

2014/0036734 A1    2/2014 Fong et al.
2014/0208134 A1    7/2014 Waters et al.
2015/0268688 A1    9/2015 Leinonen et al.

FOREIGN PATENT DOCUMENTS

WO    2009056559 A1    5/2009

OTHER PUBLICATIONS

"Universal Serial Bus Type-C Port Controller Interface Specification," Revision 1.0, Version 1.1, USB Type-C Port Controller, Interface Specification, Jul. 2016, 90 pages.
"USB 2.0 Type-C receptacle," USB Type-C Specification, Release 1.2, Draft 20160309, USB Type-C Engineering Change Notice, USB Implementers Forum, Form 20140811-ECN, 6 pages.
"USB 3.0 Adopters Agreement," Agreement_020411, 6 pages.
(Continued)

*Primary Examiner* — Farley Abad
*Assistant Examiner* — Dayton Lewis-Taylor
(74) *Attorney, Agent, or Firm* — Nicholson De Vos Webster & Elliott LLP

(57) ABSTRACT

Methods and apparatuses relating to resolving roles for dual role serial bus devices are described. In one embodiment, an apparatus includes a serial bus receptacle to receive a serial bus plug of a device, a power supply electrically coupled to the serial bus receptacle, a multiple role toggling circuit to toggle the power supply between a power source role and a power sink role, wherein the device comprises a second power supply to toggle between a power source role and a power sink role, and a randomizer circuit to cause a plurality of different, toggling duty cycles and/or a plurality of different, toggling frequencies to be applied to the multiple role toggling circuit.

24 Claims, 18 Drawing Sheets

(56) References Cited

OTHER PUBLICATIONS

"USB 3.1 CTLE," USB 3.1 Engineering Change Notice, UDB_3_1r1.0_07_31_2013, USB Implementers Forum, Form 20131608-ECN, 16 pages.
"USB 3.1 Device Class Specification for Debug Devices," USB 3.1 Debug Class, Revision 1.0, Jul. 14, 2015, 129 pages.
"USB 3.1 LTM," USB 3.1 Engineering Change Notice, USB Implementers Forum, Form 20131608-ECN, 5 pages.
"USB 3.1 PTM Value," USB 3.1 Engineering Change Notice, USB_3_1r1.0_07_31 2013, USB Implementers Forum, Form 20131608-ECN, 2 pages.
"USB 3.1 Specification—Welcome Message," Oct. 1, 2014, 1 page.
"USB 3.1 VBUS Max Limit," USB 3.1 Engineering Change Notice, USB_3_1r1.0_07_31_2013, USB Implementers Forum, Form 20131608-ECN, 3 pages.
"USB 3.1 wHubDelay," USB 3.1 Engineering Change Notice, USB_3_1r1.0_07_31_2013, USB Implementers Forum, Form 20131608-ECN, 2 pages.
"USB PD Wait Timing," USB Power Delivery Specification, Revision 2.0, Version 1.2, USB Implementers Forum, Form 20140811-ECN, 7 pages.
"USB PD Wait Timing," USB Power Delivery Specification, Revision 3.0, Version 1.0a, USB Implementers Forum, Form 20140811-ESN, 7 pages.
"USB Power Delivery Specification," Adopters Agreement, Amendment Letter, Jul. 9, 2012, 1 page.
"USB Type-C ECR on the SRC-to-TrySRC looping," USB Type-C Engineering Change Notice, USB Type-C Specification, Release 1.1, Apr. 3, 2015, USB Implementers Forum, Form 20140811-ECN 5 pages.
"USB Type-C ECR Vconn Requirements," USB Type-C Specification, Release 1.2, USB Type-C Engineering Change Notice, USB Implementers Forum, Form 20140811-ECN, 23 pages.
"USB3.1 SCD Clarifications," USB 3.1 Engineering Change Notice Form, USB Implementers Forum, Form 20131608-ECN, 3 pages.
"USB3.1 SKP Ordered Set Definition," USB 3.1 Engineering Change Notice, USB Implementers Forum, Form 20131608-ECN, 7 pages.
"USB3.1 tHubDriveResume," USB 3.1 Engineering Change Notice, USB_3_1r1.0_07_31_20131 USB Implementers Forum, Form 20131608-ECN, 2 pages.
"USB3.1 U3/U2 TX Common Mode Specification," USB 3.0 Engineering Change Notice Form, USB Implementers Forum, Form ECN 12022008, 5 pages.
"VSafe5V Voltage Range Clarification," USB Power Delivery Specification, Revision 2.0, Version 1.2, USB Implementers Forum, Form 20140811-ECN, 2 pages.
International Search Report and Written Opinion for Application No. PCT/US2017/048959, dated Dec. 14, 2017, 15 pages.
"Applicability of Messages," USB Power Delivery Engineering Change Notice, USB Power Delivery Specification Revision 2.0, V1.2, USB Implementers Forum, Form 20140811-ECN, 9 pages.
"Applicability of Messages," USB Power Delivery Specification, Revision 3.0, V1 .0a, USB Implementers Forum, Form 20140811-ECN, 14 pages.
"Change plug overmold length from MAX to REF," USB Type-C Specification, Release 1.2, USB Type-C Engineering Change Notice, USB Implementers Forum, Form 20140811-ECN, 3 pages.
"Correction for Attached.SNK," USB Type-C Engineering Change Notice, USB Type-C Specification, Release 1.2, Draft, Dec. 2015, USB Implementers Forum, Form 20140811-ECN, 3 pages.
"D+/D− DC Resistance," USB Type-C Specification, Release 1.2, USB Type-C Engineering Change Notice, USB Implementers Forum, Form 20140811-ECN, 4 pages.
"Debug Accessory Appendix," USB Type-C Specification, Release 1.2, Mar. 25, 2016, USB Type-C Engineering Change Notice, USB Implementers Forum, Form 20140811-ECN, 2 pages.
"DRP and DRD bits in SrcCap and SnkCap messages," USB Power Delivery Specification, Revision 2.0, Version 1.2, USB Implementers Forum, Form 20140811-ECN, 3 pages.
"DRP and DRD bits in SrcCap and SnkCap messages," USB Power Delivery Specification, Revision 3.0, Version 1.0a, USB Implementers Forum, Form 20140811-ECN, 3 pages.
"Gen 1 AC Coupling," USB 3.1 Engineering Change Notice Form, USB Implementers Forum, Form 20131608-ECN, 3 pages.
"HSEQ," USB 3.1 Engineering Change Notice, USB_3_1r1.0_07_31_2013, USB Implementers Forum, Form 20131608-ECN, 8 pages.
"iCapChange Removal," USB Power Delivery Specification, Revision 2.0, Version 1.2, USB Implementers Forum, Form 20140811-ECN, 3 pages.
"Sink No Response Timer," USB Power Delivery Specification, Revision 2.0, Version 1.2, USB Implementers Forum, Form 20140811-ECN, 29 pages.
"Sink NoResponseTimer," USB Power Delivery Specification, Revision 3.0, Version 1.0a, USB Implementers Forum, Form 20140811-ECN, 27 pages.
"Inter-Chip Supplement to the USB Revision 3.0 Specification," Revision 1.02, May 19, 2014, 77 pages.
"SKP OS Bytes During Compliance Clarification," USB 3.1 Engineering Change Notice, USB_3_1r1.0_07_31_2013, USB Implementers Forum, Form 20131608-ECN, 3 pages.
"Language Relating to VDM Commands," USB Power Delivery Specification, Revision 2.0, V1.2, USB Implementers Forum, Form 20140811-ECN, 4 pages.
"Language Relating to VDM Commands," USB Power Delivery Specification, Revision 3.0, V1.0a, USB Implementers Forum, Form 20140811-ECN, 4 pages.
"SLC IS SDS," USB 3.1 Engineering Change Notice, USB_3_1r1.0_07_31_ 2013, USB Implementers Forum, Form 20131608-ECN, 3 pages.
"LFPS Typos," USB 3.1 Engineering Change Notice Form, USB Implementers Forum, Form 20131608-ECN, 3 pages.
"Loopback Bert," USB 3.1 Engineering Change Notice Form, USB Implementers Forum, Form 20131608-ECN, 2 pages.
"Loss Budget Clarification," USB 3.1 Engineering Change Notice Form, USB 3.1 Specification Release, USB Implementers Forum, Form 20131608-ECN, 2 pages.
"On-The-Go and Embedded Host Supplement to the USB Revision 3.0 Specification," Revision 1.1, May 10, 2012, 74 pages.
"Source State Diagram," USB Power Delivery Specification, Revision 2.0, Version 1.2, USB Implementers Forum, Form 20140811-ECN, 8 pages.
"Source VCONN Discharge," USB Type-C Specification, Release 1.2, USB Type-C Engineering Change Notice, USB Implementers Forum, Form 20140811-ECN, 10 pages.
"PD and USB bed Device association," USB Power Delivery Specification, Revision 3.0, Version 1.0a, USB Implementers Forum, Form 20140811-ECN, 2 pages.
"Specification Revision interoperability," USB Power Delivery Specification, Revision 3.0, Version 1.0a, USB Implementers Forum, Form 20140811-ECN, 4 pages.
"Polling LFPS," USB 3.1 Engineering Change Notice, USB_3_1r1.0_07_31_2013, USB Implementers Forum, Form 20131608-ECN, 6 pages.
"Reference Clock Reqs," USB 3.1 Engineering Change Notice Form, USB Implementers Forum, Form 20131608-ECN, 3 pages.
"Removal of the iCapChange parameter," USB Power Delivery Specification, Revision 3.0, Version 1.0a, USB Implementers Forum, Form 20140811-ECN, 3 pages.
"Remove PD and USB bcdDevice association," USB Power Delivery Specification Revision 2.0, Version 1.2, USB Implementers Forum, Form 20140811-ECN, 2 pages.
"Retimer PTM," USB 3.1 Engineering Change Notice Form, USB Implementers Forum, Form 20131608-ECR, 3 pages.
"Rx High Z measurement," USB 3.1 Engineering Change Notice Form, USB Implementers Forum, Form 20131608-ECN, 3 pages.
"Rx High Z Value," USB 3.1 Engineering Change Notice Form, USB Implementers Forum, Form 20131608-ECN, 3 pages.
"Rx JTOL RJ Correction," USB 3.1 Engineering Change Notice Form, USB 3.1 Specification Release, USB Implementers Forum, Form 20131608-ECN, 3 pages.

(56) References Cited

OTHER PUBLICATIONS

"SSP ping LFPS tRepeat Requirement," USB 3.1 Engineering Change Notice, USB_3_1r1.0_07_31_2013, USB Implementers Forum, Form 20131608-ECN, 2 pages.
"SSP System Jitter Budget," USB 3.1 Engineering Change Notice, USB_3_1r1.0_07_31_2013, USB Implementers Forum, Form 20131608-ECN, 5 pages.
"tProtErrHardReset_r3," USB Power Delivery Specification, Revision 3.0, Version 1.0a, USB Implementers Forum, Form 20140811-ECN, 10 pages.
"Try.SNK and Try.SRC usage recommendations," USB Type C Specification, Release 1.2, USB TypeC Engineering Change Notice, 2 pages.
"TSEQ Clarifications," USB 3.1 Engineering Change Notice Form, USB Implementers Forum, Form 20131608-ECR, 3 pages.
"TSEQ Gen2 Clarification," USB 3.1 Engineering Change Notice, USB_3_1r1.0_07_31_2013, USB Implementers Forum, Form 20131608-ECN, 5 pages.
"TSEQ SKP Insertion Interval," USB 3.1 Engineering Change Notice, USB Implementers Forum, Form 20131608-ECN, 2 pages.
"Tx RJ Measurement Point," USB 3.1 Engineering Change Notice Form, USB Implementers Forum, Form 20131608-ECN, 2 pages.
"Universal Serial Bus 3.1 Specification," Repeaters, Revision 1.0, 20 pages.
"Universal Serial Bus 3.1 Specification," Revision 1.0, Jul. 26, 2013, 631 pages.
"Universal Serial Bus Power Delivery Specification," Revision 1.0, Including Errata through Jun. 26, 2013 (Version 1.2), 328 pages.
"Universal Serial Bus Power Delivery Specification," Revision 2.0, V1.2, Mar. 25, 2016 + ECNs Aug. 2, 2016, 552 pages.
"Universal Serial Bus Power Delivery Specification," Revision 3.0, V1.0a, ECNs, Aug. 2, 2016, 528 pages.
"Universal Serial Bus Type-C Authentication Specification," Revision 1.0, Mar. 25, 2016, 56 pages.
"Universal Serial Bus Type-C Cable and Connector Specification," Release 1.2, Mar. 25, 2016, 221 pages.
"Universal Serial Bus Type-C Locking Connector Specification," Revision 1.0, Mar. 9, 2016, 13 pages.

* cited by examiner

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | $V_{BUS}$ | CC1 | D+ | D- | SBU1 | $V_{BUS}$ | RX2- | RX2+ | GND |
| GND | RX1+ | RX1- | $V_{BUS}$ | SBU2 | D- | D+ | CC2 | $V_{BUS}$ | TX2- | TX2+ | GND |
| B12 | B11 | B10 | B9 | B8 | B7 | B6 | B5 | B4 | B3 | B2 | B1 |

| A12 | A11 | A10 | A9 | A8 | A7 | A6 | A5 | A4 | A3 | A2 | A1 |
|---|---|---|---|---|---|---|---|---|---|---|---|
| GND | RX2+ | RX2- | $V_{BUS}$ | SBU1 | D- | D+ | CC1 | $V_{BUS}$ | TX1- | TX1+ | GND |
| GND | TX2+ | TX2- | $V_{BUS}$ | CC2 ($V_{CONN}$) | | | SBU2 | $V_{BUS}$ | RX1- | RX1+ | GND |
| B1 | B2 | B3 | B4 | B5 | B6 | B7 | B8 | B9 | B10 | B11 | B12 |

US 10,289,589 B2

APPARATUSES TO RESOLVE ROLES FOR DUAL ROLE SERIAL BUS DEVICES

TECHNICAL FIELD

The disclosure relates generally to electronics, and, more specifically, an embodiment of the disclosure relates to circuitry to resolve roles for dual role serial bus devices.

BACKGROUND

Electronics (e.g., computer systems) generally employ one or more electrical connections to facilitate the transmittal of data (e.g., communication) between devices, such as between a computing system and a (e.g., external) peripheral.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
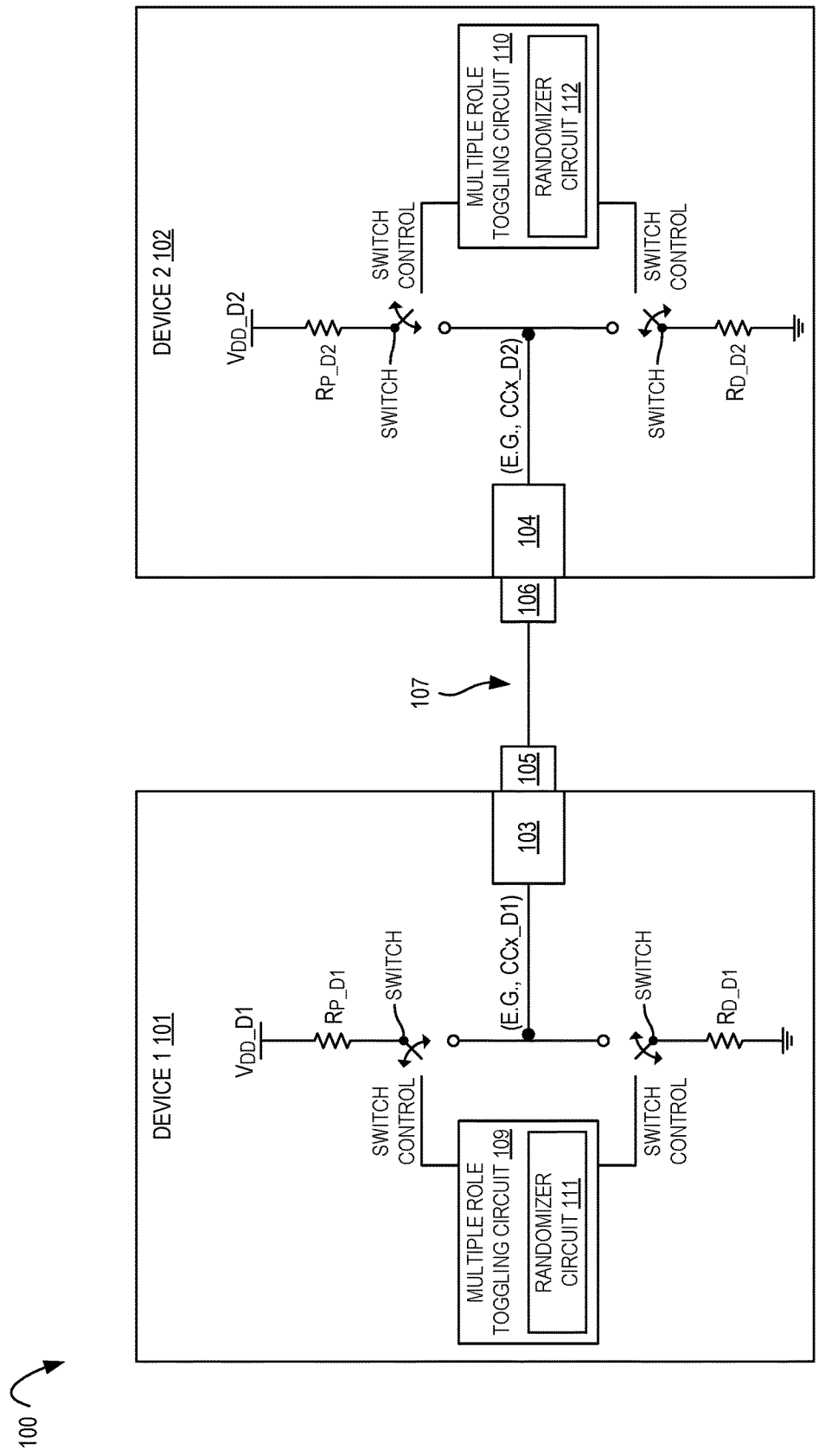
FIG. 1 illustrates a schematic diagram of a circuit including a first multiple role device coupled to a second multiple role device according to embodiments of the disclosure.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Electronics (e.g., computing systems) generally employ one or more electrical connections (e.g., wired or wireless connections) to facilitate the transmission and reception of data (e.g., communication) between devices, such as, but not limited to, between a computing system (e.g., a computer including a hardware processor) and a (e.g., external) peripheral. Non-limiting examples of peripherals are external storage devices (e.g., hard disk drives) and mobile devices (e.g., smartphones and tablets).

Certain electrical connections (e.g., couplings) include parallel conductors (e.g., parallel wires or other electrically conductive paths). One embodiment of an electrical connection is a bus. One embodiment of a bus is a multiple conductor bus, for example, where the conductors (e.g., wires) allow parallel (e.g., concurrent) transmittal of data thereon. The term electrical connection (e.g., bus) may generally refer to one or more separate physical connections, communication lines and/or interfaces, shared connections, and/or point-to-point connections, which may be connected by appropriate bridges, hubs, adapters, and/or controllers. A serial bus (e.g., serial bus architecture) may generally refer to a (e.g., shared) communication channel that transmits data one bit after another (e.g., sequentially), for example, over a (e.g., each) single wire or fiber.

The phrase Universal Serial Bus (USB) generally refers to a specification(s) for a serial bus that supports the transmission and reception of data (e.g., and power and/or control) between a downstream facing port (e.g., a host) and a one or more upstream facing ports (e.g., devices), for example, through one or more hubs there between.

In certain embodiments, a first device may connect to a second device through a (e.g., wired) electrical connection, for example, a serial bus cable having multiple conductors (e.g., wires). A cable may include a plug, e.g., on each end thereof. A receptacle of a device (or a plug of a device) may receive a plug (or receptacle) coupled to another device. In one embodiment, a plug may be received (e.g., inserted) into a receptacle in a plurality of orientations, for example, flipped from one orientation to another orientation, e.g., and retain its (e.g., full) functions. This may be referred to as "flip-ability", e.g., flip-able between a right-side up position and an upside-down position.

Certain embodiments (for example, with one or more flip-able plug and receptacle pairs) may allow a first device and/or a second device to toggle between different roles, for example, as the devices wait for a physical connection to be made and each device's role to be established, e.g., in contrast to a connector's type defining a role, such as a type-A USB connector being a host (data master) role and a type-B USB connector being a slave (data recipient) role. In certain embodiments herein, a first device may be in a first role (e.g., an upstream facing data port role, downstream facing data port role, power source role, and/or power sink role) and a second device in a second (e.g., same or different than the first) role (e.g., an upstream facing data port role, downstream facing data port role, power source role, and/or power sink role). In one embodiment, a device (e.g., a circuit thereof) presents itself (e.g., during initial attachment) as a first of a plurality of roles, then changes to a second of a plurality of roles, etc. In one embodiment, a device (e.g., a circuit thereof) presents itself (e.g., during initial attachment) as a first role, then toggles to a second role, then back to the first role, for example, and continues to do so, e.g., until the other device acknowledges that role (e.g., via an acknowledgement signal). For example, a current USB Type-C specification (e.g., revision 1.2 of Mar. 25, 2016) and a current USB Power Delivery specification (e.g., revision 3.0, version 1.0a of Aug. 2, 2016) includes an upstream facing data port role (e.g., a host) and a downstream facing data port role for each device (e.g., a USB device) and/or a power source role and a power sink role. In one embodiment, a device in the power source role (e.g., that acquires the power source role) is also in the downstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles). In one embodiment, a device in the power sink role (e.g., that acquires the power sink role) is also in the upstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles).

In certain embodiments, a first device with multiple (e.g., dual) roles may connect to a second device with multiple (e.g., dual) roles (for example, where each device's role is not defined by the connector (e.g., a plug or receptacle thereof) type, e.g., two devices connected by a cable that has the same plug at each end). In embodiments, each device may present itself in the same role, for example, where the devices do not connect to each other, e.g., do not connect from a user's perspective or with respect to a communication protocol (for example, electrically and/or physically connected devices that do not allow data and/or power transmission or reception, e.g., other than communications to define a device's role). Certain devices (e.g., operating according to specification(s) or industry standards) do not have predefined roles, for example, each device is to establish its role, for example, or it does not function, e.g., to transmit and receive data and/or source and sink power. Certain devices (e.g., operating according to specification(s) or industry standards) do not define device role(s), for example, in the point-to-point connection by the connector type, e.g., to accept and provide power and/or data with an externally connected device (e.g., a laptop connected to phone, a laptop connected to an external (e.g., USB drive), a phone connected to tablet, etc.).

For example, each device of a plurality of devices may include a same connector (e.g., plug or receptacle thereof), for example, such that circuitry is to cause signaling (e.g., between connected devices) while the connections are physically made (e.g., during an initialization phase) in order to define the role(s) of each device, for example, one device as a host and another device as a slave and/or one device as a power source (e.g., provider) and another device as the power sink (e.g., consumer). In certain embodiments, devices that toggle (e.g., switch) between either of a plurality of roles (e.g., a dual role device) are to toggle (e.g., via a toggling circuit) back and forth between a plurality of roles, for example, (e.g., only) between an upstream facing data port role (e.g., slave or device role) and a downstream facing data port role (e.g., host role). Device(s) may toggle between a plurality of roles until a specific (e.g., stable) state is established, for example, during a connection process (e.g., initial attach). A multiple (e.g., dual) role device may connect to a fixed role device or another multiple (e.g., dual) role device. In one embodiment, both devices are capable of the same (e.g., pair of) roles. In one embodiment, both multiple (e.g., dual) role devices (e.g., the ports thereof) are toggling between a first role and a second role (for example, via one or more of each device's configuration channels (e.g., each device's CC1 and CC2 pins)) at (e.g., substantially) the same frequency (e.g., time rate) and/or duty cycle. Thus in certain embodiments, a physical connection is made (e.g., with a USB Type-C cable) between two or more multiple role devices but none of the devices detects the signaling to define a role (e.g., no device detects a signaling event or sends a response to acknowledge the signaling event).

Certain embodiments herein provide for a randomization of one or both of multiple role device's toggling frequency and its toggling duty cycle, for example, to minimize the probability of in sync toggling. Certain embodiments herein provide for a randomization of one or both of multiple role device's toggling frequency and its duty cycle during each cycle of toggling between different device roles. Certain embodiments herein randomize a multiple (e.g., dual) role device's toggling frequency and duty cycle, e.g., to vary the high and low times of the toggling, to reduce or eliminate the possibility of two (e.g., unique) separate devices having the same timings, e.g., over a plurality of cycles. Certain embodiments herein provide for one or more multiple (e.g., dual) role devices connected together to resolve their upstream facing data port role and downstream facing data port role and/or their power source role and power sink role faster than without randomization, e.g., as the likelihood all (e.g., both) devices are asserting (e.g., displaying) the same role at the same time is reduced (e.g., lower) or eliminated.

Certain embodiments herein add more randomization to the toggling frequency and/or duty cycle of a device asserting each role indicator than a device with a fixed duty cycle and/or frequency of toggling, e.g., more randomization than a substantially fixed toggling duty cycle and/or a substantially fixed frequency of toggling that rely only on the inaccuracy (e.g., according to manufacturing tolerances) of internal timers or oscillators to provide variance (e.g., misalignment) to resolve roles and avoid the case where the toggling is in sync. Certain embodiments herein reduce role resolution times as well as reduce or avoid any occurrences where neither device sees the role defining event (e.g., a cable and/or plug insertion event). Certain embodiments herein reduce (e.g., to the end user) the resolution time significantly, e.g., the overall time from connection of the devices to usability (e.g., to allow payload data to be transmitted and received, e.g., and not role merely role resolution data transmission and receipt) is shorter.

Turning now to the figures, FIG. 1 illustrates a schematic diagram of a circuit 100 including a first dual role device 101 coupled to a second dual role device 102 according to embodiments of the disclosure. Depicted device 101 is (e.g., electrically and/or physically) coupled to device 102 through a cable 107, although other couplings may be utilized in other embodiments. Depicted device 101 includes a receptacle 103 coupled to its circuitry and depicted device 102 includes a receptacle 104 coupled to its circuitry, e.g., input and output (I/O) circuitry. Depicted cable 107 includes a (e.g., multiple parallel wire) conductor to transmit data between device 101 and device 102. Depicted cable 107 includes a first end with a plug 105 to removably couple to (e.g., slide into) receptacle 103 of device 101 and an opposite, second end with a plug 106 to removably couple to (e.g., slide into) receptacle 104 of device 102. Cable 107 may couple (e.g., electrically and physically) device 101 to device 102, e.g., to allow a transfer of data between (e.g., to and/or from) device 101 and device 102.

Depicted device 101 includes a multiple role toggling circuit 109 and a randomizer circuit 111. Depicted device 102 includes a multiple role toggling circuit 110 and a randomizer circuit 112. In one embodiment, only one device includes a randomizer circuit. In one embodiment, a randomizer circuit is separate from a multiple role toggling circuit. In one embodiment, each of the connected devices includes a multiple role toggling circuit (e.g., to switch a device between multiple roles). A multiple role toggling circuit may be a (e.g., USB) port controller circuit.

One or both of multiple role toggling circuit 109 and multiple role toggling circuit 110 may include a switch or plurality of switches that move between positions. For example, multiple role toggling circuit 109 may provide a role indicator from device 101 to device 102. A role of a device may be a first role and a second, different role, for example, a first, upstream facing data port role and second, downstream facing data port role (e.g., dual-role-data (DRD) roles) and/or a first, power sink role and a second, power source role (e.g., dual-role-power (DRP) roles). A role indicator may be transmitted from a device (e.g., one of device 101 and device 102) to another device (e.g., the other of device 101 and device 102), e.g., across the cable 107, for example, across one or more communication channels of the cable. A multiple (e.g., dual) role toggling circuit may provide a role indicator by connecting one or more switches (e.g., from an open position where there is no connection to providing a connection). Multiple role toggling circuit 109 of device 101 and multiple role toggling circuit 110 of device 102 may switch between providing a first role indicator to indicate that its device is in a first role and providing a second role indicator to indicate that its device is in a second role. In the depicted embodiment, a first role indicator may be exposing (e.g., connecting via a switch or switches in that device) a connection (e.g., configuration channel (CC)) from another device to a pull-up voltage (e.g., via a pull-up resistor (e.g., $R_P$) connected to a voltage source (e.g., $V_{DD}$, $V_{CC}$, or other (e.g., positive) voltage source) and/or not connecting the connection (e.g., configuration channel (CC)) to a pull-down voltage (e.g., via a pull-down resistor (e.g., $R_D$) connected to a voltage sink (e.g., a ground). In the depicted embodiment, a second role indicator may be not exposing (e.g., connecting via a switch or switches in that device) a connection (e.g., configuration channel (CC)) from another device to a pull-up voltage (e.g., via a pull-up resistor (e.g., $R_P$) connected to a voltage source (e.g., $V_{DD}$, $V_{CC}$, or other (e.g., positive) voltage source) and/or connecting the connection (e.g., configuration channel (CC)) to a pull-down voltage (e.g., via a pull-down resistor (e.g., $R_D$) connected to a voltage sink (e.g., a ground). In one embodiment, only one connection is made at a time from a configuration channel (e.g., on a pin) to a power source and a power sink. This may be a different power source (e.g., $V_{BUS}$) and power sink than is to be provided between (e.g., to and/or from) device 101 and device 102. In certain embodiments, a role indicator is exposing a connection from another device to a current source, e.g., instead of to a pull-up resistor. In one embodiment, the role indicator (for example, for $R_P$) may be provided by either a (e.g., constant) voltage source or a (e.g., constant) current source. In one embodiment, the CCx voltage and/or current settles to a value that is interpreted by both devices to indicate a (e.g., each) device's role.

Figure 3:
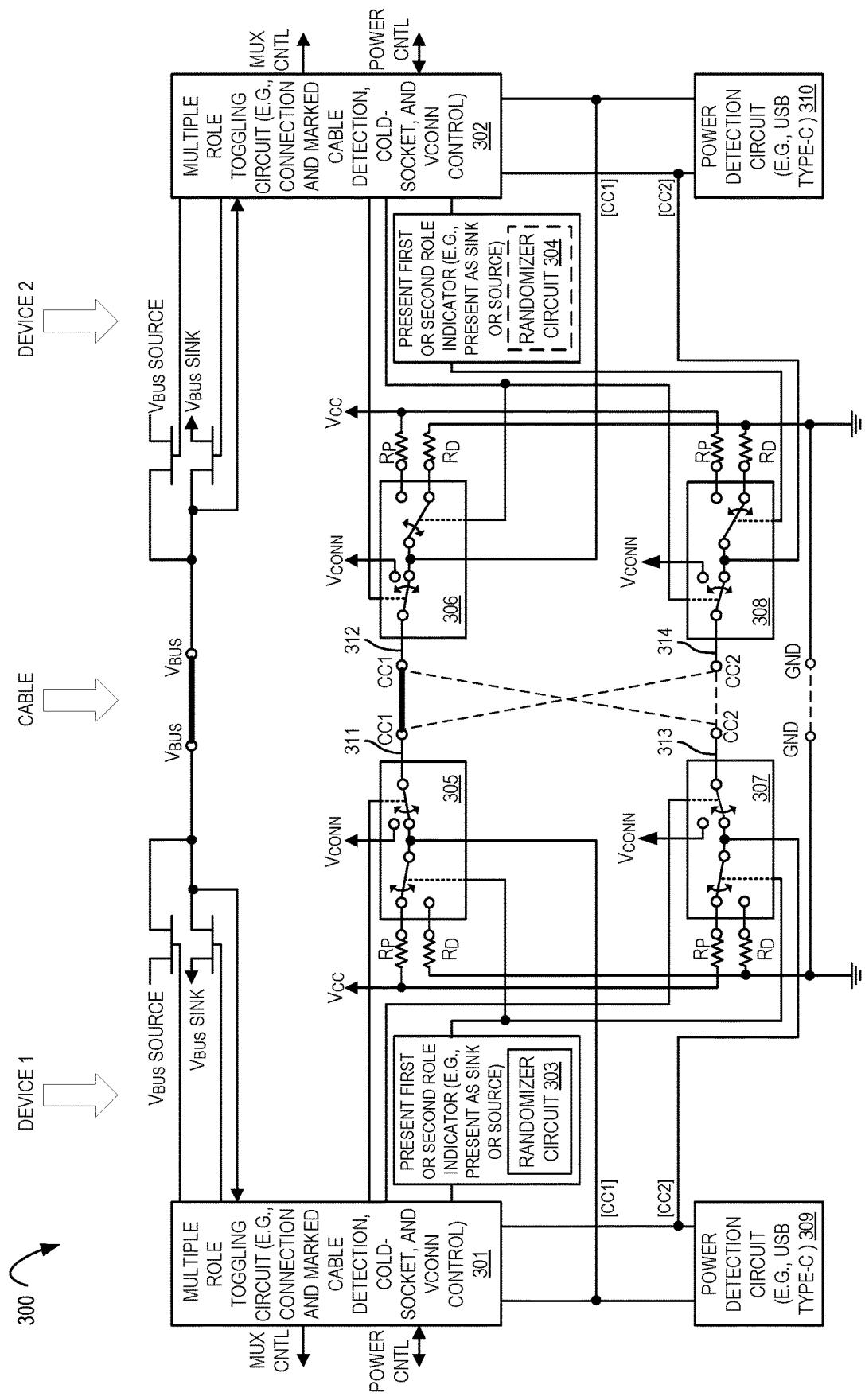
FIG. 3 illustrates a schematic diagram of a circuit including a first multiple role device coupled to a second multiple role device according to embodiments of the disclosure.
Figure 4:
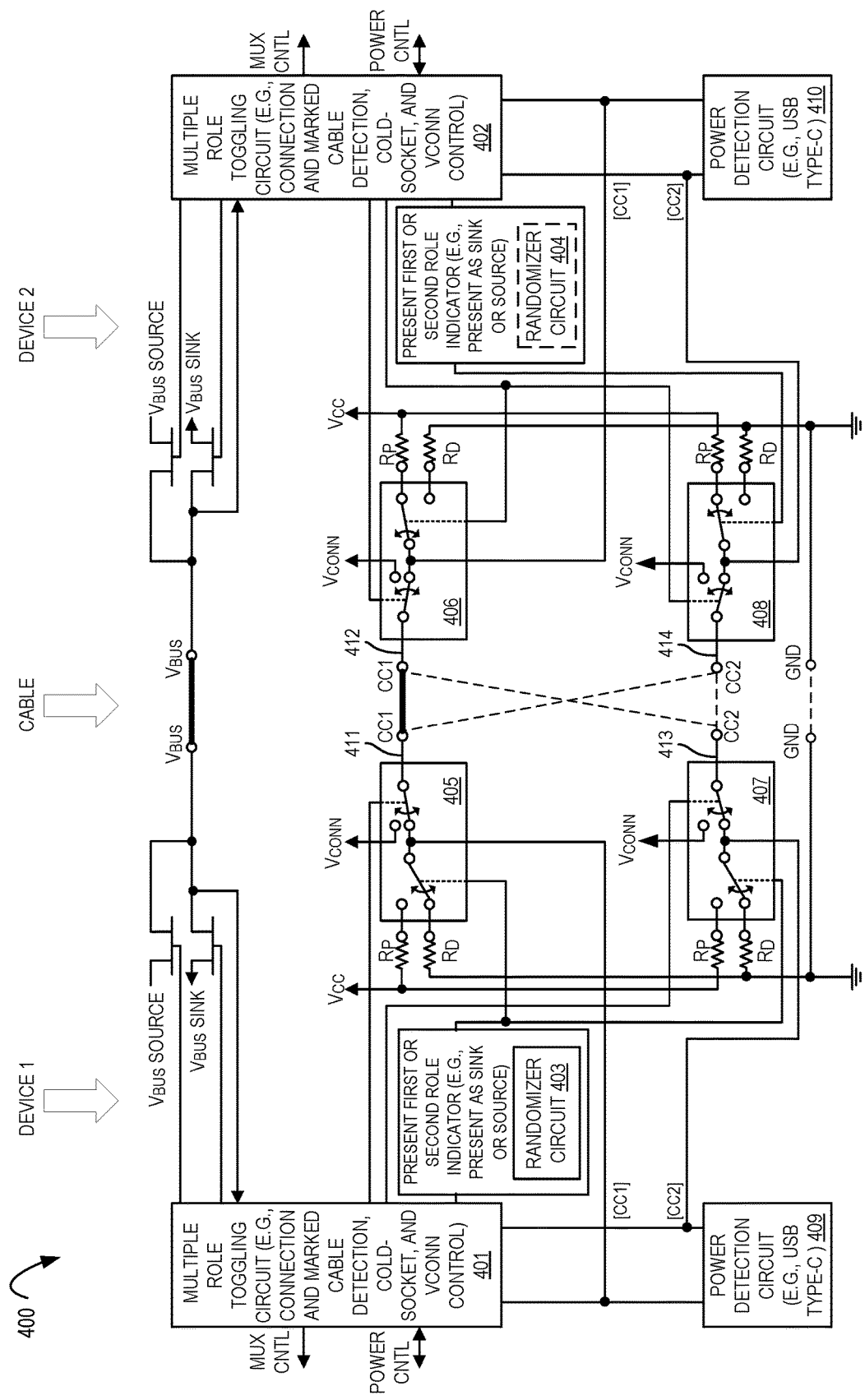
FIG. 4 illustrates a schematic diagram of a circuit including a first multiple role device coupled to a second multiple role device according to embodiments of the disclosure.

There may be multiple instances of circuits in each device to provide a role indicator, for example, a respective role indicator on each of multiple configuration channels (CCs), e.g., with certain embodiments thereof shown in FIGS. 3 and 4. In certain embodiments, the variable x in CCx may be 1, 2, 3, 4, 5, 6, 7, 8, 9, 10, etc. to indicate the identity of one or more configuration channels. A single multiple role toggling circuit may control each configuration channel of multiple configuration channels of a single device, or a plurality of respective multiple role toggling circuits may control each configuration channel of multiple configuration channels of a single device. In an embodiment with only two roles, a toggling circuit may switch the role of the device (e.g., one or more channels of the device) back and forth between each role until one or more of the device and the connected device(s) establishes its role. In an embodiment with more than two roles, a toggling circuit may cycle the role of the device (e.g., one or more channels of the device) between each role until one or more (e.g., all) of the device and its connected device(s) establishes its role.

In certain embodiments, a randomizer circuit may be included to randomize a device's role indicator, for example, randomize a device's toggling frequency and/or a device's toggling duty cycle (e.g., the switch controls signals sent by the toggling circuit), e.g., with the randomizer circuit as part of a multiple role toggling circuit or as a separate circuit. In one embodiment, each device has its own randomizer circuit.

Figure 2:
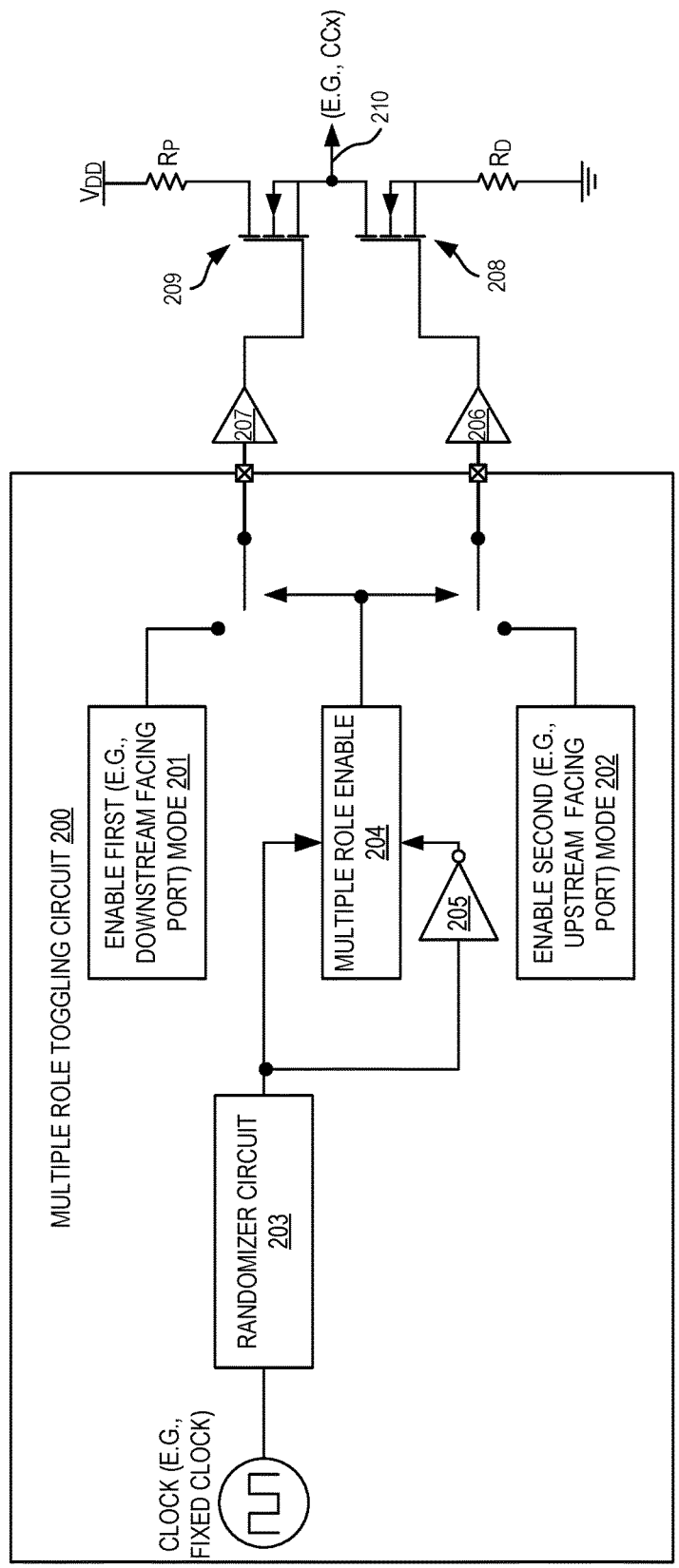
FIG. 2 illustrates a schematic diagram of a multiple role toggling circuit according to embodiments of the disclosure.

FIG. 2 illustrates a schematic diagram of a multiple role toggling circuit 200 according to embodiments of the disclosure. Depicted multiple role toggling circuit 200 includes a clock (e.g., to provide a (substantially) uniform signal (e.g., square or other waveform)) to provide a timing signal. Randomizer circuit 203 may receive the input clock signal and output a randomized clock signal. A randomized clock signal may include a varying (e.g., different in each time cycle of the clock) frequency (e.g., time rate) and/or duty cycle, for example, see FIGS. 8A-8C. In certain embodiments, duty cycle may generally refer to the percentage of one period in which a signal is active (e.g., in one role). In embodiments, a period may generally refer to the amount of time it takes for a signal to complete a high and low (e.g., on and off) cycle. For example, a 40% duty cycle may refer to a signal being active (e.g., the pulse's duration) for 40% of that period. In one embodiment, duty cycle may be varied (e.g., randomized) between about 30% and about 70%. In certain embodiments, frequency (e.g., temporal frequency) may refer to the number of occurrences of a repeating event per unit time. In one embodiment, frequency may be varied (e.g., randomized) between about 50 milliseconds (ms) and about 100 milliseconds. In one embodiment, frequency may be varied (e.g., randomized) between about 1 millisecond and about 100 or 150 milliseconds. In one embodiment, frequency may be varied (e.g., randomized) between about 75 milliseconds and about 150 milliseconds. In one embodiment, frequency may be varied (e.g., randomized) between about 400 milliseconds and about 800 milliseconds.

Randomizer circuit 203 may vary the duty cycle and/or frequency of the role indicator(s) of the multiple role toggling circuit 200. For example, depicted multiple role toggling circuit 200 includes an enable first (e.g., downstream facing port and/or power source) mode 201 circuit, an enable second (e.g., upstream facing port and/or power sink) mode 202 circuit, and a multiple (e.g., dual) role enable 204 circuit. Dual role enable 204 circuit may selectively cause the dual role toggling circuit 200 (e.g., disposed within a device) to present itself in the first mode or the second mode depending on which mode is enabled. Dual role enable 204 circuit may select the enable first mode 201 circuit to cause a first role indicator to be presented at terminal (e.g., input/output) 210 (e.g., one or more of (e.g., all of one device's) configuration channels (CCs)), for example, by the causing the driver 207 (e.g., amplifier) to cause the transistor 209 (e.g., metal-oxide-semiconductor field-effect transistor (MOSFET)) to connect the terminal 210 to the pull-up resistor ($R_P$), and thus to the power source ($V_{DD}$), to show a voltage at the terminal 210 of about the level of $V_{DD}$. Dual role enable 204 circuit may select the enable second mode 202 circuit to cause a second role indicator to be presented at the terminal 210 (e.g., one or more of (e.g., all of one device's) configuration channels (CCs)), for example, by the causing the driver 206 (e.g., amplifier) to cause the transistor 208 (e.g., MOSFET) to connect the terminal 210 to the pull-down resistor ($R_D$), and thus to the ground, to show a voltage at the terminal 210 of about ground (e.g., zero volts). Randomizer circuit 203 may vary the duty cycle and/or frequency of the role indicator (e.g., voltage and/or current) shown at the terminal 210. For example, a randomizer circuit may randomize one or more of the duty cycle and/or frequency of the clock input into the dual role toggling circuit and the duty cycle and/or frequency of a role indicator provided at an output (e.g., of the dual role toggling circuit). Randomizer circuit 203 may have multiple outputs to a multiple (e.g., dual) role enable 204 circuit, e.g., with one output including an inverter (e.g., NOT gate) to invert that output signal, for example, such that only one of a first mode and a second mode are presented at terminal (e.g., output) 210 at any given time.

FIG. 3 illustrates a schematic diagram of a circuit 300 including a first multiple role device coupled to a second multiple role device according to embodiments of the disclosure. Coupling between devices may be through a cable including one or more conductors, see, e.g., FIGS. 10-13. A coupling may include a conductor for power (e.g., $V_{BUS}$), e.g., from a power supply. $V_{BUS}$ may be about five volts. A coupling may include one or more conductors for communication of a role indicator (e.g., a configuration channel (CC)). FIG. 3 includes a first configuration channel conductor (CC1) and a second configuration channel conductor (CC2) in each device. Device 1's CC1 may connect to device 2's CC1. Additionally or alternatively, device 1's CC2 may connect to device 2's CC2. In another embodiment, device 1's CC1 may connect to device 2's CC2. Additionally or alternatively, device 1's CC2 may connect to device 2's CC1. For example, a plug (e.g., of a cable) may be flip-able between a right-side up position and an upside-down position in a receptacle (e.g., of a device).

Device 1's multiple role toggling circuit 301 may toggle device 1 between a first role and a second role, e.g., from the roles discussed herein. Device 2's multiple role toggling circuit 302 may toggle device 2 between a first role and a second role e.g., from the roles discussed herein. Randomizer circuit 303 may randomize a device's role indicator, for example, randomize a device's toggling frequency and/or a device's duty cycle (e.g., the switch controls signals sent by the toggling circuit). Randomizer circuit 303 may randomize the role indicator provided by (e.g., with the same role asserted from each of) switch circuit 305 and/or switch circuit 307, for example, randomized within a (e.g., same) pre-selected range (e.g., a range discussed herein). In one embodiment, multiple role toggling circuit 301 is to provide switch circuit(s) with a control signal (e.g., shown partially as dotted lines) to present a first or second role indicator (a role indicator corresponding to one or more of an upstream facing port role, downstream facing port role, power source role, and/or power sink role). In the depicted embodiment, a multiple role toggling circuit (e.g., 301) may cause a switch circuit (e.g., 305) to select between a connection to a pull-down resistor ($R_D$) or a pull-up resistor ($R_P$) (or a current source) and to connect the terminal (for example, 311, e.g., CC1) to a voltage supply (e.g., $V_{CONN}$). In the depicted embodiment, switch circuit 305 is connecting terminal 311 (e.g., CC1) of device 1 to terminal 312 (e.g., CC1) of device 2 and to pull-up resistor ($R_P$) of switch circuit 305, which may indicate to device 2 that device 1 is in a downstream facing data port role and/or a power source role (e.g., the power provided across conductor $V_{BUS}$). In the depicted embodiment, switch circuit 307 may (e.g., simultaneous to the operation of switch circuit 305) connect terminal 313 (e.g., CC2) of device 1 to terminal 314 (e.g., CC2) of device 2 and to pull-up resistor ($R_P$) of switch circuit 307 and pull-down resistor ($R_D$) of switch circuit 308, e.g., to indicate device roles as discussed above. Power detection circuit 309 may be used to detect the power (e.g., current and/or voltage) on one or more connections, e.g., on CC1 and/or CC2.

Randomizer circuit 304 (if present) may randomize a device's role indicator, for example, randomize a device's toggling frequency and/or a device's duty cycle (e.g., the switch controls signals sent by the toggling circuit). Randomizer circuit 304 may randomize the role indicator provided by (e.g., with the same role asserted from each of) switch circuit 306 and/or switch circuit 308, for example, randomized within a pre-selected range (e.g., a range discussed herein). In one embodiment, multiple role toggling circuit 302 is to provide switch circuit(s) with a control signal (e.g., shown partially as dotted lines) to present a first or second role indicator (a role indicator corresponding to one or more of an upstream facing port role, downstream facing port role, power source role, and/or power sink role). In the depicted embodiment, a multiple role toggling circuit (e.g., 302) may cause a switch circuit (e.g., 306) to select between a connection to a pull-down resistor ($R_D$) or a pull-up resistor ($R_P$) and to connect the terminal (for example, 312, e.g., CC1) to a voltage supply (e.g., $V_{CONN}$). In the depicted embodiment, switch circuit 306 is connecting terminal 312 (e.g., CC1) of device 2 to terminal 311 (e.g., CC1) of device 1 and to pull-down resistor ($R_D$) of switch circuit 306, which may indicate to device 1 that device 2 is in an upstream facing data port role and/or a power sink role (e.g., the power provided across conductor $V_{BUS}$). In the depicted embodiment, switch circuit 308 may (e.g., simultaneous to the operation of switch circuit 306) connect terminal 314 (e.g., CC2) of device 2 to terminal 313 (e.g., CC2) of device 1 and to pull-down resistor ($R_D$) of switch circuit 308 (e.g., a ground). Power detection circuit 310 may be used to detect the power (e.g., current and/or voltage) on one or more connections, e.g., on CC1 and/or CC2.

In one embodiment, e.g., after a device establishes its role, a switch may move from connecting a terminal (e.g., 311) between (i) an $R_P$ (ground) and $R_D$ (first voltage source or current source) circuit to (ii) a second voltage source (e.g., $V_{CONN}$). In one embodiment, $V_{CONN}$ is between about 2.7 Volts to about 5 Volts. In one embodiment, $V_{CONN}$ is a separate from $V_{BUS}$ and/or $V_{CC}$. In one embodiment, a device is to set the switches of one or both of its switch circuits as depicted, e.g., the switches of a single device showing the same type of role (e.g., role indication) at the same time. In another embodiment, a device may set the switches or one or both of its switch circuits to any combination of positions thereof. In one embodiment, randomizer circuit is a component in multiple role toggling circuit. Power control signals may be provided according to a specification, for example, USB Power Delivery (PD) Specification Rev. 3.0, Version 1.0a, of Aug. 2, 2016.

FIG. 4 illustrates a schematic diagram of a circuit 400 including a first multiple role device coupled to a second multiple role device according to embodiments of the disclosure. Coupling between devices may be through a cable including one or more conductors, see, e.g., FIGS. 10-13. A coupling may include a conductor for power (e.g., $V_{BUS}$). $V_{BUS}$ may be about five volts. A coupling may include one or more conductors for communication of a role indicator (e.g., a configuration channel (CC)). FIG. 4 includes a first configuration channel conductor (CC1) and a second configuration channel conductor (CC2) in each device. Device 1's CC1 may connect to device 2's CC1. Additionally or alternatively, device 1's CC2 may connect to device 2's CC2. In another embodiment, device 1's CC1 may connect to device 2's CC2. Additionally or alternatively, device 1's CC2 may connect to device 2's CC1. For example, a plug (e.g., of a cable) may be flip-able between a right-side up position and an upside-down position in a receptacle (e.g., of a device).

Device 1's multiple role toggling circuit 401 may toggle device 1 between a first role and a second role, e.g., from the roles discussed herein. Device 2's multiple role toggling circuit 402 may toggle device 2 between a first role and a second role e.g., from the roles discussed herein. Randomizer circuit 403 may randomize a device's role indicator, for example, randomize a device's toggling frequency and/or a device's duty cycle (e.g., the switch controls signals sent by the toggling circuit). Randomizer circuit 403 may randomize the role indicator provided by (e.g., with the same role asserted from each of) switch circuit 405 and/or switch circuit 407, for example, randomized within a (e.g., same) pre-selected range (e.g., a range discussed herein). In one embodiment, multiple role toggling circuit 401 is to provide switch circuit(s) with a control signal (e.g., shown partially as dotted lines) to present a first or second role indicator (a role indicator corresponding to one or more of an upstream facing port role, downstream facing port role, power source role, and/or power sink role). In the depicted embodiment, a multiple role toggling circuit (e.g., 401) may cause a switch circuit (e.g., 405) to select between a connection to a pull-down resistor ($R_D$) or a pull-up resistor ($R_P$) and to connect the terminal (for example, 411, e.g., CC1) to a voltage supply (e.g., $V_{CONN}$). In the depicted embodiment, switch circuit 405 is connecting terminal 411 (e.g., CC1) of device 1 to terminal 412 (e.g., CC1) of device 2 and to pull-down resistor ($R_D$) of switch circuit 405, which may indicate to device 2 that device 1 is in an upstream facing data port role and/or a power sink role (e.g., the power provided across conductor $V_{BUS}$). In the depicted embodiment, switch circuit 407 may (e.g., simultaneous to the operation of switch circuit 405) connect terminal 413 (e.g., CC2) of device 1 to terminal 414 (e.g., CC2) of device 2 and to pull-down resistor ($R_D$) of switch circuit 407 (e.g., a ground). Power detection circuit 409 may be used to detect the power (e.g., current and/or voltage) on one or more connections, e.g., on CC1 and/or CC2.

Randomizer circuit 404 (if present) may randomize a device's role indicator, for example, randomize a device's toggling frequency and/or a device's duty cycle (e.g., the switch controls signals sent by the toggling circuit). Randomizer circuit 404 may randomize the role indicator provided by (e.g., with the same role asserted from each of) switch circuit 406 and/or switch circuit 408, for example, randomized within a pre-selected range (e.g., a range discussed herein). In one embodiment, multiple role toggling circuit 402 is to provide switch circuit(s) with a control signal (e.g., shown partially as dotted lines) to present a first or second role indicator (a role indicator corresponding to one or more of an upstream facing port role, downstream facing port role, power source role, and/or power sink role). In the depicted embodiment, a multiple role toggling circuit (e.g., 402) may cause a switch circuit (e.g., 406) to select between a connection to (i) a pull-down resistor ($R_D$) to connect the terminal (for example, 412, e.g., CC1) to a ground or (ii) a pull-up resistor ($R_P$) to connect the terminal (for example, 412, e.g., CC1) to a voltage supply (e.g., $V_{CC}$). In the depicted embodiment, switch circuit 406 is connecting terminal 412 (e.g., CC1) of device 2 to terminal 411 (e.g., CC1) of device 1 and to pull-up resistor ($R_P$) of switch circuit 406, which may indicate to device 1 that device 2 is in a downstream facing data port role and/or a power source role (e.g., the power provided across conductor $V_{BUS}$). In the depicted embodiment, switch circuit 408 may (e.g., simultaneous to the operation of switch circuit 406) connect terminal 414 (e.g., CC2) of device 2 to terminal 413 (e.g., CC2) of device 1 and to pull-up resistor ($R_P$) of switch circuit 408 and pull-down resistor ($R_D$) of switch circuit 407, e.g., to indicate device roles as discussed above. Power detection circuit 410 may be used to detect the power (e.g., current and/or voltage) on one or more connections, e.g., on CC1 and/or CC2.

In one embodiment, e.g., after a device establishes its role, a switch may move from connecting a terminal (e.g., 411) between (i) an $R_P$ (ground) and $R_D$ (first voltage source or current source) circuit to (ii) a second voltage source (e.g., $V_{CONN}$). In one embodiment, $V_{CONN}$ is between about 2.7

Volts to about 5 Volts. In one embodiment, $V_{CONN}$ is a separate from $V_{BUS}$ and/or $V_{CC}$. In one embodiment, a device is to set the switches of one or both of its switch circuits as depicted, e.g., the switches of a single device showing the same type of role (e.g., role indication) at the same time. In another embodiment, a device may set the switches or one or both of its switch circuits to any combination of positions thereof. In one embodiment, randomizer circuit is a component in multiple role toggling circuit. Power control signals may be provided according to a specification, for example, USB Power Delivery (PD) Specification Rev. 3.0, Version 1.0a, of Aug. 2, 2016.

In certain embodiments, a device presents itself in a power source role by connecting all configuration channels (e.g., CC1 and CC2 of a device) to a power supply (e.g., to source current independently on both CC1 and CC2) through the device's pull-up resistor(s) ($R_P$), for example, and not providing (e.g., driving) any other power (e.g., $V_{BUS}$ or $V_{CONN}$). In certain embodiments, a device presents itself in a power sink role by terminating all configuration channels (e.g., CC1 and CC2 of a device) to ground through the device's pull-down resistor(s) ($R_D$), for example, and not providing (e.g., driving) any other power (e.g., $V_{BUS}$ or $V_{CONN}$). In certain embodiments, a device that is attached and operating in (e.g., establishes) a power sink role is also operating as an upward facing data port. In one embodiment, the power roles and/or data roles may then be changed, e.g., using USB PD command(s).

In certain embodiments, a multiple (e.g., dual) role toggling circuit, e.g., until a specific stable state is established, alternates between exposing itself as a power source and a power sink. The timing of this process may be dictated by a period (e.g., tDRP), duty cycle (e.g., percentage of time that the multiple (e.g., dual) role toggling circuit exposes a pull-down resistor ($R_P$) (e.g., dcSRC.DRP)), and role transition time (e.g., tDRPTransition). In an embodiment when the multiple (e.g., dual) role toggling circuit is presenting as a power source, it may follow a power source operation to detect an attached power sink (e.g., device), for example, if a power sink is detected, the multiple (e.g., dual) role toggling circuit may apply $V_{BUS}$, $V_{CONN}$, and continues to operate as a power source for a minimum of time (e.g., tDRPHold and cease alternating). In an embodiment when the multiple (e.g., dual) role toggling circuit is presenting as a power sink, it may monitor $V_{BUS}$ to detect that it is attached to a power source, for example, if a power source is detected, the multiple (e.g., dual) role toggling circuit may continue to operate as a power sink (e.g., and cease alternating). In an embodiment where the device of the multiple (e.g., dual) role toggling circuit supports other functions (e.g., USB Power Delivery and/or alternate modes), further communications (e.g., USB PD communication) may be utilized.

Figure 5:
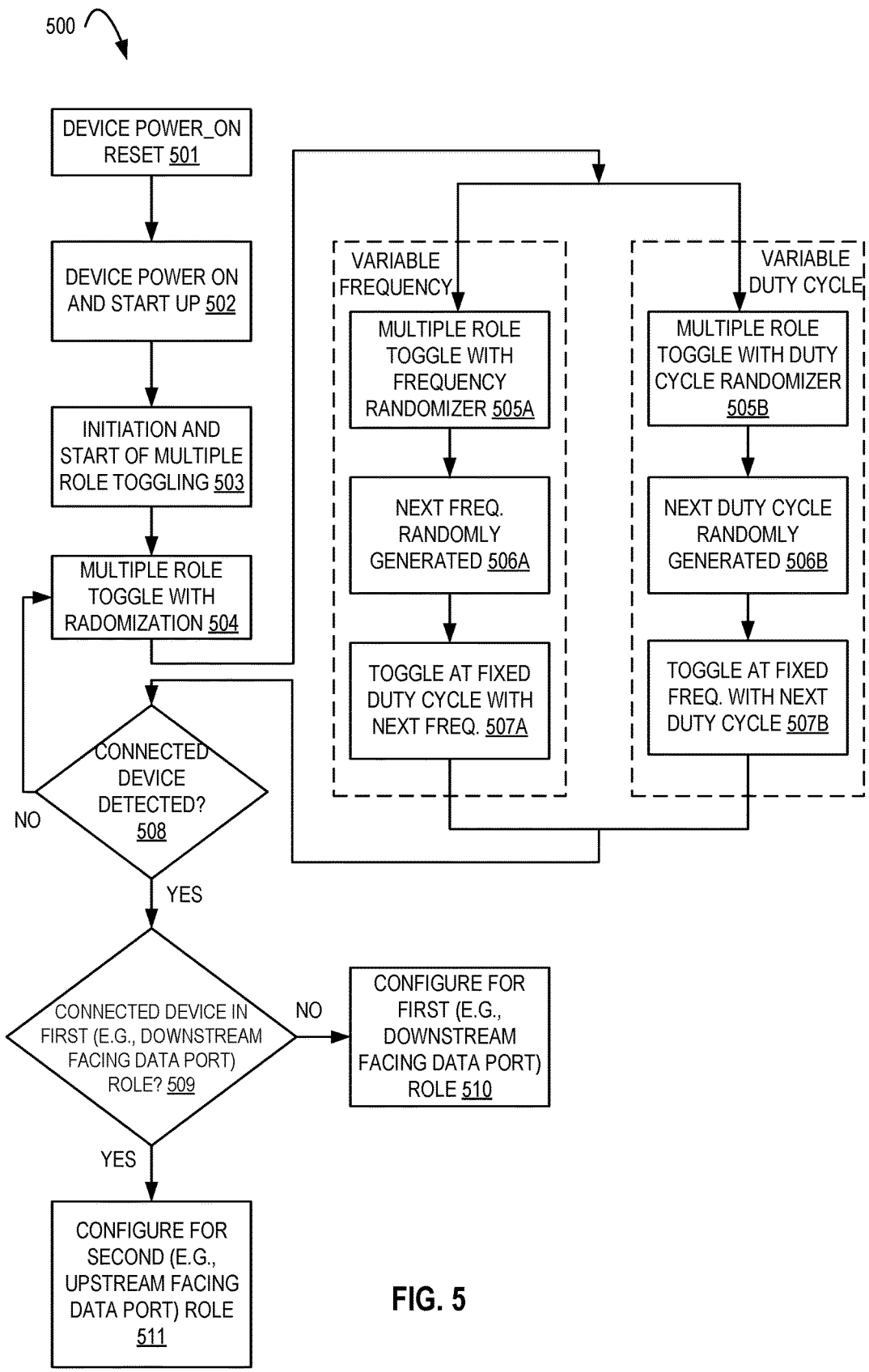
FIG. 5 illustrates a flow diagram of providing variable frequency or variable duty cycle for a multiple role toggling circuit according to embodiments of the disclosure.

FIG. 5 illustrates a flow diagram 500 of providing variable frequency or variable duty cycle for a multiple role toggling circuit according to embodiments of the disclosure. Although the term device is used below, it may refer to two devices (e.g., simultaneously and independently) traversing through the flow. In FIG. 5, a device experiences a reset (e.g., a power-on reset 501), and then the device power on and start up 502 may occur. The device then has an initiation and start of multiple (e.g. dual) role toggling 503. If the device is to perform a multiple role toggle with randomization 504 (e.g., as indicated by a control bit or bits), the device then follows the corresponding path for role toggling with (e.g., only) frequency randomization 505A or for role toggling with (e.g., only) duty cycle randomization 505B. For role toggling with (e.g., only) frequency randomization 505A, a next frequency is randomly (e.g., within a range of allowable frequencies) generated 506A, and then the device is to role toggle at a fixed duty cycle with that next frequency 507A (with the next frequency from 506A). For role toggling with (e.g., only) duty cycle randomization 505B, a next duty cycle is randomly (e.g., within a range of allowable duty cycles) generated 506B, and then the device is to role toggle at a fixed frequency with that next duty cycle 507B (with the duty cycle from 506B).

When a connected device is detected 508 (for example, a device in a different (e.g., counterpart) role than the role the device proceeding through flow 500), then if the connected device is in a first role 509, the device proceeding through the flow 500 is configured be in a second role 511 and if the connected device is not in a first role 509, the device proceeding through the flow 500 is configured be in the first role 510. In one embodiment, a device is to toggle between the variable frequency path (e.g., starting with 505A) and the variable duty cycle path (e.g., starting with 505B) for each iteration from 504. In one embodiment, a path is preselected, e.g., to be one of the variable frequency path (e.g., starting with 505A) and the variable duty cycle path (e.g., starting with 505B).

Figure 6:
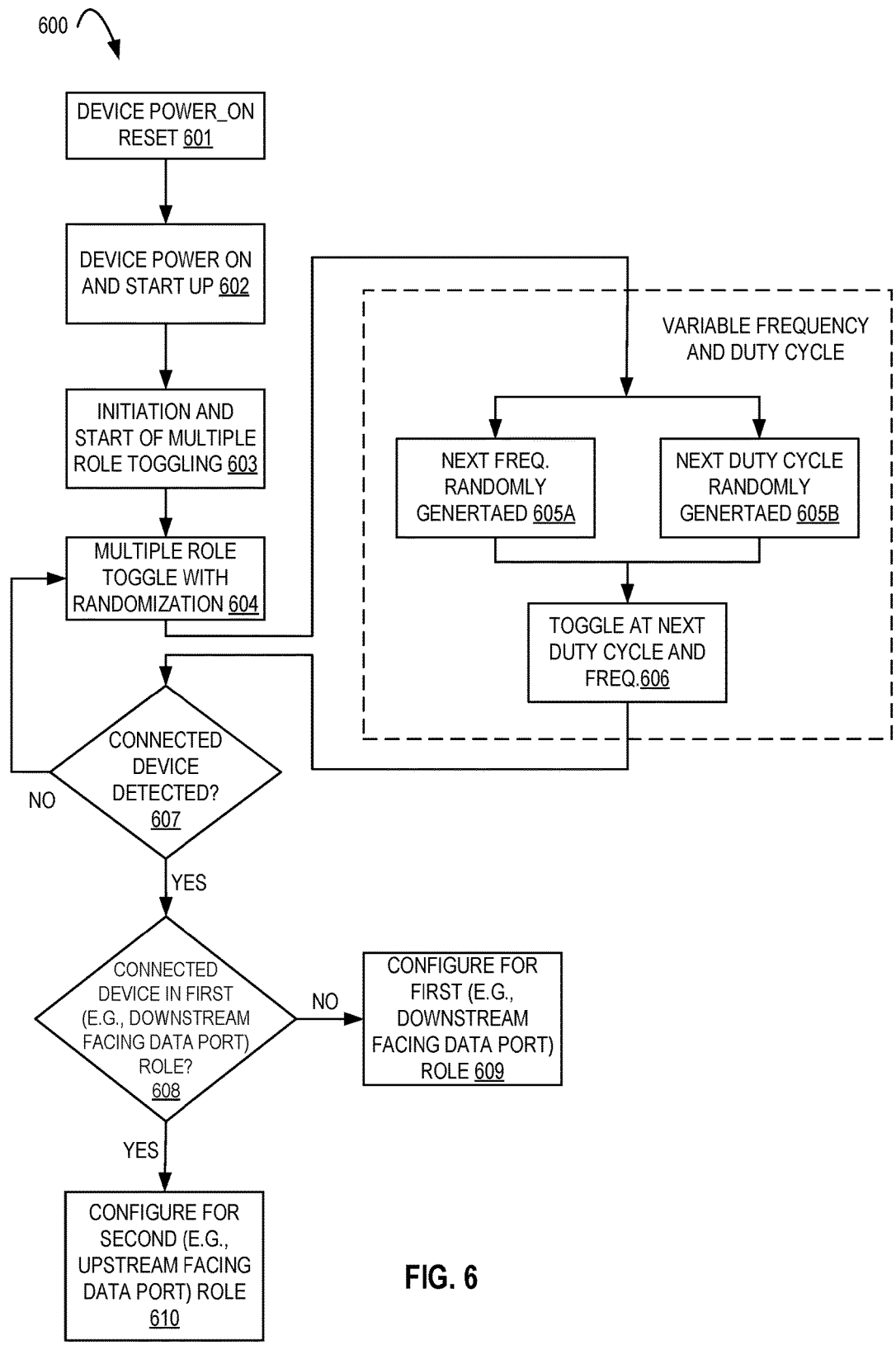
FIG. 6 illustrates a flow diagram of providing variable frequency and variable duty cycle for a multiple role toggling circuit according to embodiments of the disclosure.

FIG. 6 illustrates a flow diagram 600 of providing variable frequency and variable duty cycle for a multiple role toggling circuit according to embodiments of the disclosure. Although the term device is used below, it may refer to two devices (e.g., simultaneously) traversing through the flow. In FIG. 6, a device experiences a reset (e.g., a power-on reset 601), and then the device power on and start up 602 may occur. The device then has an initiation and start of multiple (e.g. dual) role toggling 603. If the device is to perform a multiple role toggle with randomization 604 (e.g., as indicated by a control bit or bits), the device then follows the corresponding paths for role toggling with (e.g., concurrent) frequency randomization 605A and duty cycle randomization 605B. For role toggling with frequency randomization 605A, a next frequency is randomly (e.g., within a range of allowable frequencies) generated 605A. For role toggling with duty cycle randomization 605B, a next duty cycle is randomly (e.g., within a range of allowable duty cycles) generated 605B. Then the device is to role toggle with that next duty cycle and next frequency 606.

When a connected device is detected 607 (for example, a device in a different (e.g., counterpart) role than the role the device proceeding through flow 600), then if the connected device is in a first role 608, the device proceeding through the flow 600 is configured be in a second role 610 and if the connected device is not in a first role 608, the device proceeding through the flow 600 is configured be in the first role 609. Certain embodiments herein allow for more rapid configuration, according to a communication protocol, of a device to a first-in-time role, e.g., where the first-in-time role of a device may be later swapped.

Figure 7:
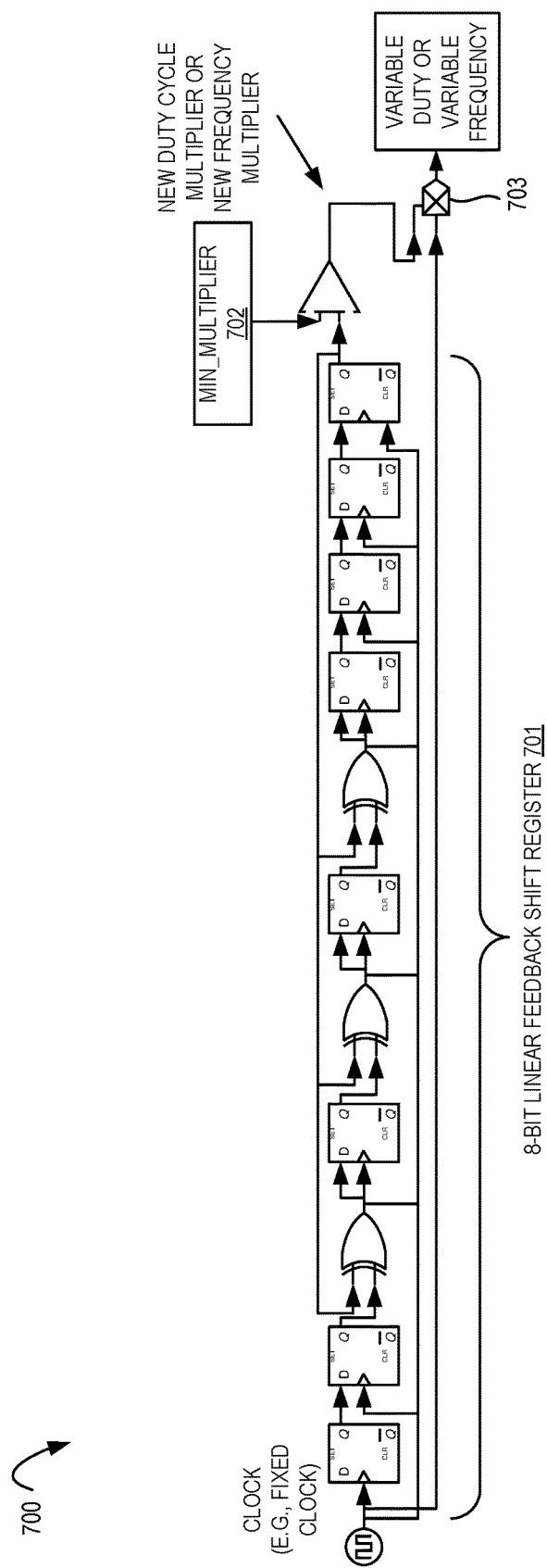
FIG. 7 illustrates a schematic diagram of a randomizer circuit according to embodiments of the disclosure.

FIG. 7 illustrates a schematic diagram of a randomizer circuit 700 according to embodiments of the disclosure. Depicted randomizer circuit 700 includes multiple instances of a gated D-latch, although other types of latches or hardware logic gate circuitry may be used. Randomizer circuit 700 includes an 8-bit Linear Feedback Shift Register 701 (LFSR) to generate either of a variable frequency and duty cycle. For example, a fixed frequency may be based on certain numbers of a (e.g., fixed) clock. In one embodiment using a fixed clock, LFSR 701 generates a Random Number Output (RNO). The RNO may then be added (e.g., via adder circuit) to the minimum multiplier (e.g., MIN_MULTIPLIER register 702) to guarantee compliance within a range.

For example, where there is a minimum and maximum number of clock cycles that are to be used in order to generate either the frequency or duty cycle. The new frequency or duty cycle multiplier is then multiplied by the fixed clock with the multiplier 703 to obtain the new variable frequency or duty cycle. Please note this represents a single possibility of implementation for the randomization circuit. Various parts of the circuit may change including components such as the fixed clock or number of bits used, e.g., for the LFSR.

Figure 8:
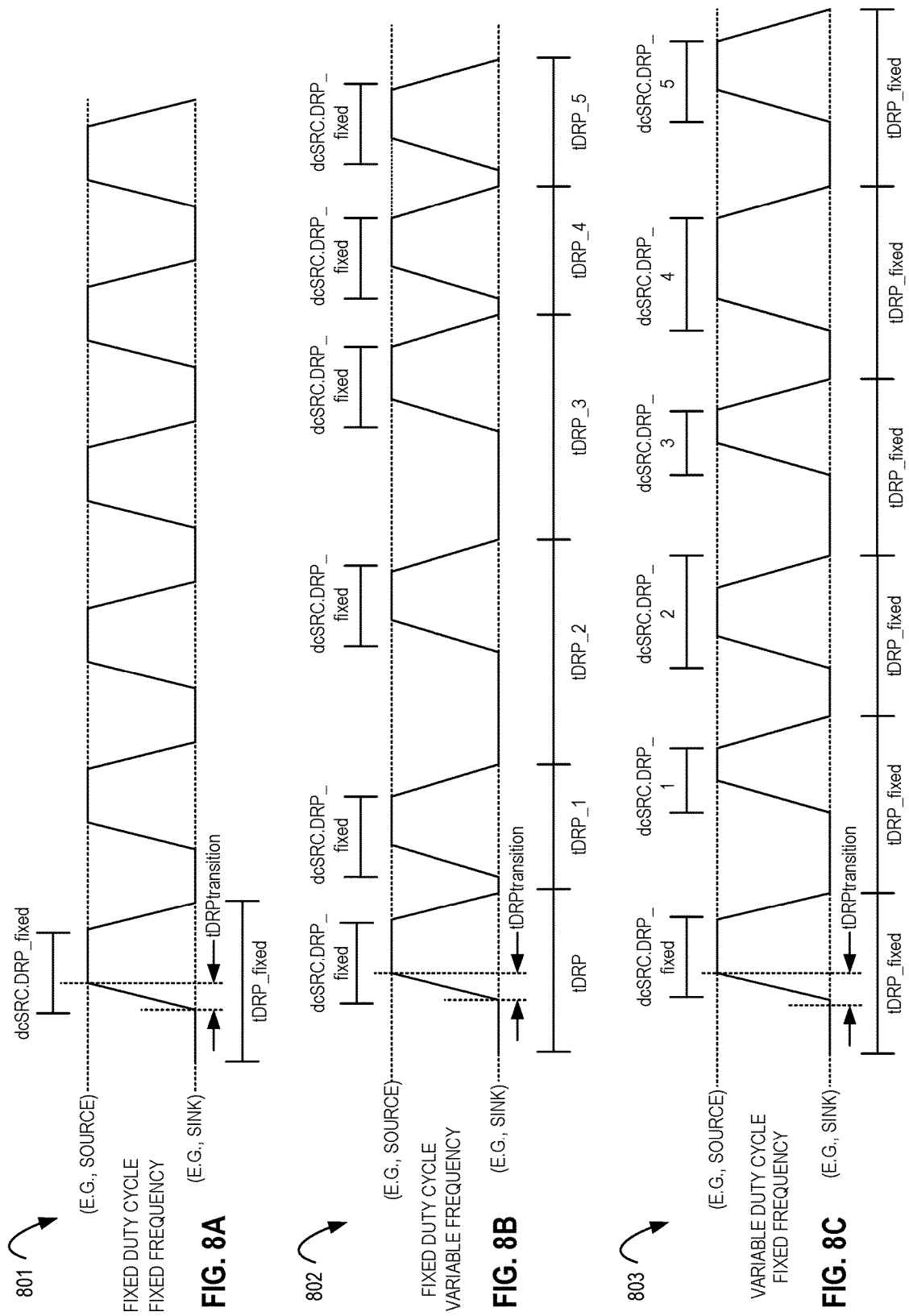
FIG. 8A illustrates a waveform diagram for a fixed frequency signal and a fixed duty cycle signal according to embodiments of the disclosure.
FIG. 8B illustrates a waveform diagram for a fixed frequency signal and a variable duty cycle signal according to embodiments of the disclosure.
FIG. 8C illustrates a waveform diagram for a variable frequency signal and a fixed duty cycle signal according to embodiments of the disclosure.

FIG. 8A illustrates a waveform diagram 801 for a fixed frequency signal and a fixed duty cycle signal (as a solid line) according to embodiments of the disclosure. FIG. 8B illustrates a waveform diagram 802 for a fixed frequency signal and a variable duty cycle signal (as a solid line) according to embodiments of the disclosure for example, generated by a randomizer circuit. FIG. 8C illustrates a waveform diagram 803 for a variable frequency signal and a fixed duty cycle signal (as a solid line) according to embodiments of the disclosure for example, generated by a randomizer circuit. Table 1 below illustrates examples of maximum and minimum values for an embodiment of a multiple (e.g., dual) role toggling circuit.

TABLE 1

Example Timing Parameters

| | Minimum | Maximum | Description |
|---|---|---|---|
| tDRP | 50 ms | 100 ms | The period a role toggling circuit (e.g., a device thereof) shall complete a power source to power sink and back advertisement |
| dcSRC.DRP | 30% | 70% | The percent of time that a role toggling circuit shall advertise Source during tDRP |
| tDRPTransition | 0 ms | 1 ms | The time a role toggling circuit shall complete transitions between power source and power sink roles during role resolution |
| tDRPTry | 75 ms | 150 ms | Wait time associated with asserting itself as a power source. |
| tDRPTryWait | 400 ms | 800 ms | Wait time associated with asserting itself as a power sink. |

Figure 9:
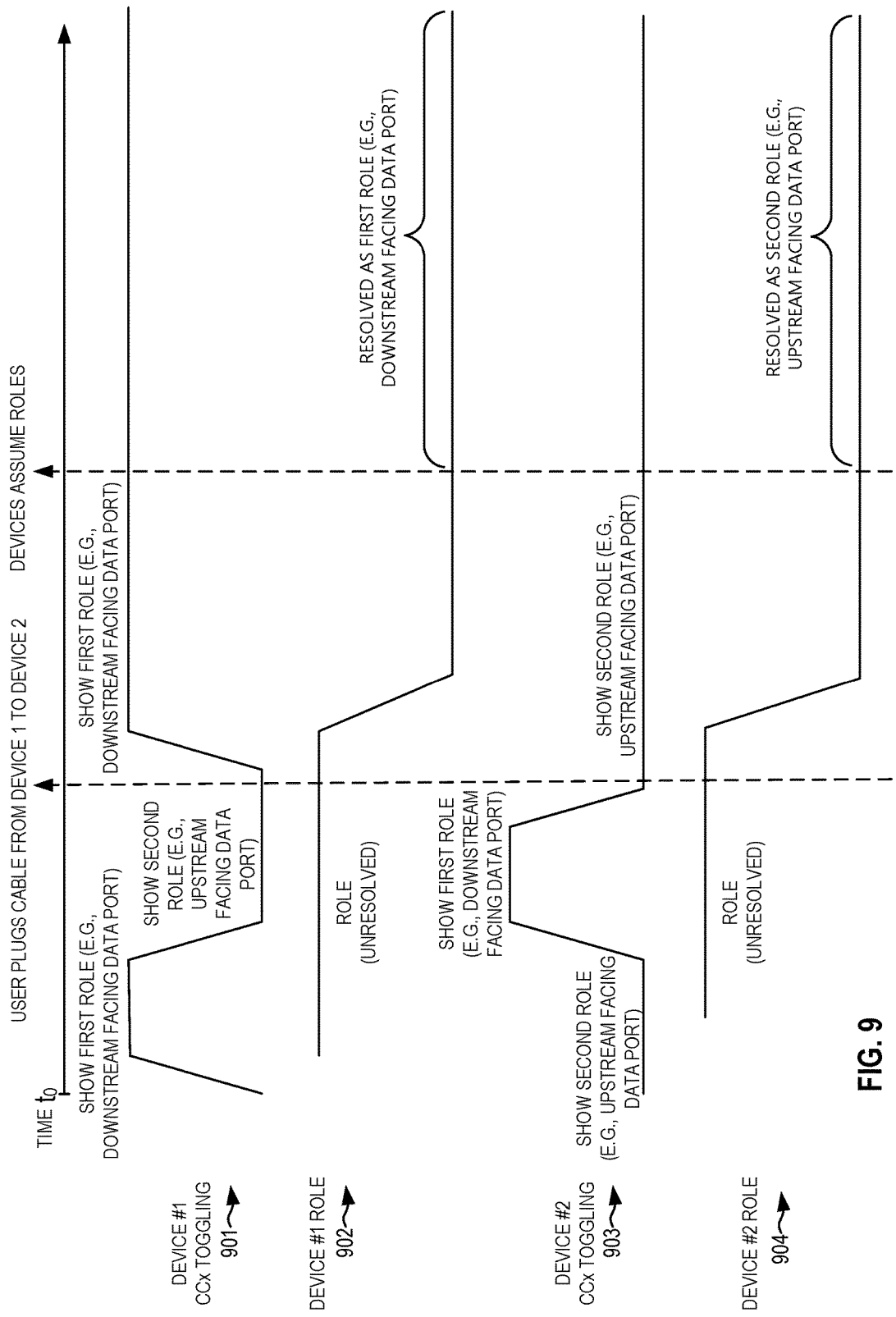
FIG. 9 illustrates waveform diagrams of role resolution of multiple devices according to embodiments of the disclosure.

FIG. 9 illustrates waveform diagrams 901-904 of role resolution of multiple devices according to embodiments of the disclosure. In one embodiment, each configuration channel (e.g., CC1 and CC2) of a device is to assert one (e.g., the same) role, e.g., at the same time.

FIGS. 10-13 below discuss embodiments of receptacles and plugs to connect one device to another device. Table 2 that follows depicts embodiments of channels (e.g., conductors) to allow signals to flow between multiple devices.

TABLE 2

Example Communication Channels

| Pin | Signal Name | Description | Mating Sequence | Pin | Signal Name | Description | Mating Sequence |
|---|---|---|---|---|---|---|---|
| A1 | GND | Ground return | First | B12 | GND | Ground return | First |
| A2 | SSTXp1 | Positive half of first (e.g., SuperSpeed) transmitter (TX) differential pair of a first type | Second | B11 | SSRXp1 | Positive half of first (e.g., SuperSpeed) receiver (RX) differential pair of the first type | Second |
| A3 | SSTXn1 | Negative half of first (e.g., SuperSpeed) TX differential pair of the first type | Second | B10 | SSRXn1 | Negative half of first (e.g., SuperSpeed) RX differential pair of the first type | Second |
| A4 | VBUS | Bus Power | First | B9 | VBUS | Bus Power | First |
| A5 | CC1 | Configuration Channel | Second | B8 | SBU2 | Sideband Use (SBU) | Second |
| A6 | Dp1 | Positive half of a second type (e.g., USB 2.0) of differential pair—Position 1 | Second | B7 | Dn2 | Negative half of the second type (e.g., USB 2.0) of differential pair—Position 2 | Second |
| A7 | Dn1 | Negative half of the second type (e.g., USB 2.0) of differential pair—Position 1 | Second | B6 | Dp2 | Positive half of the second type (e.g., USB 2.0) of differential pair—Position 2 | Second |

TABLE 2-continued

Example Communication Channels

| Pin | Signal Name | Description | Mating Sequence | Pin | Signal Name | Description | Mating Sequence |
|---|---|---|---|---|---|---|---|
| A8 | SBU1 | Sideband Use (SBU) | Second | B5 | CC2 | Configuration Channel | Second |
| A9 | VBUS | Bus Power | First | B4 | VBUS | Bus Power | First |
| A10 | SSRXn2 | Negative half of second (e.g., SuperSpeed) RX differential pair of the first type | Second | B3 | SSTXn2 | Negative half of second (e.g., SuperSpeed) TX differential pair of the first type | Second |
| A11 | SSRXp2 | Positive half of second (e.g., SuperSpeed) RX differential pair of the first type | Second | B2 | SSTXp2 | Positive half of second (e.g., SuperSpeed) TX differential pair of the first type | Second |
| A12 | GND | Ground return | First | B1 | GND | Ground return | First |

Figures 10, 11:
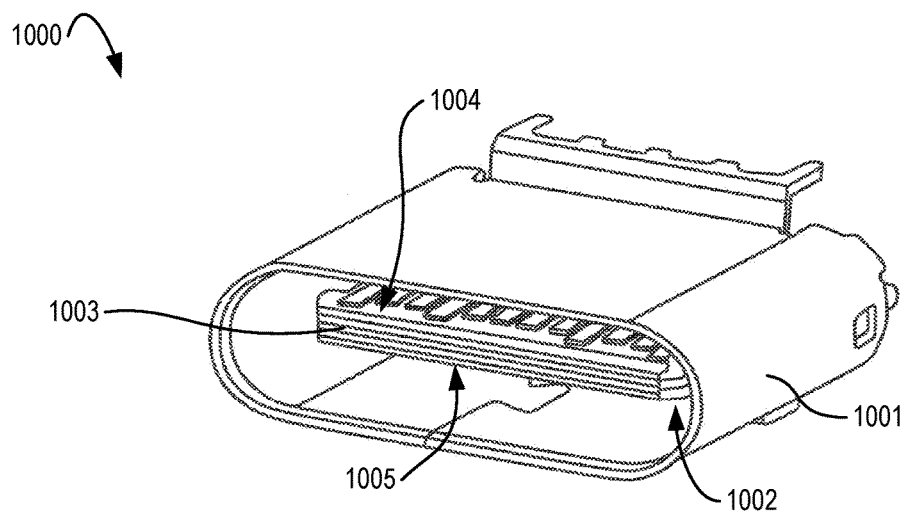
FIG. 10 illustrates a perspective view of a serial bus receptacle according to embodiments of the disclosure.
FIG. 11 illustrates a schematic diagram of the pins of a serial bus receptacle according to embodiments of the disclosure.

FIG. 10 illustrates a perspective view of a serial bus receptacle 1000 according to embodiments of the disclosure. In certain embodiments, serial bus receptacle 1000 may be part of (e.g., within) a device (e.g., mounted to a circuit board of a device).

FIG. 11 illustrates a schematic diagram 1100 of the pins of a serial bus receptacle (e.g., serial bus receptacle 1000) according to embodiments of the disclosure.

Figure 12:
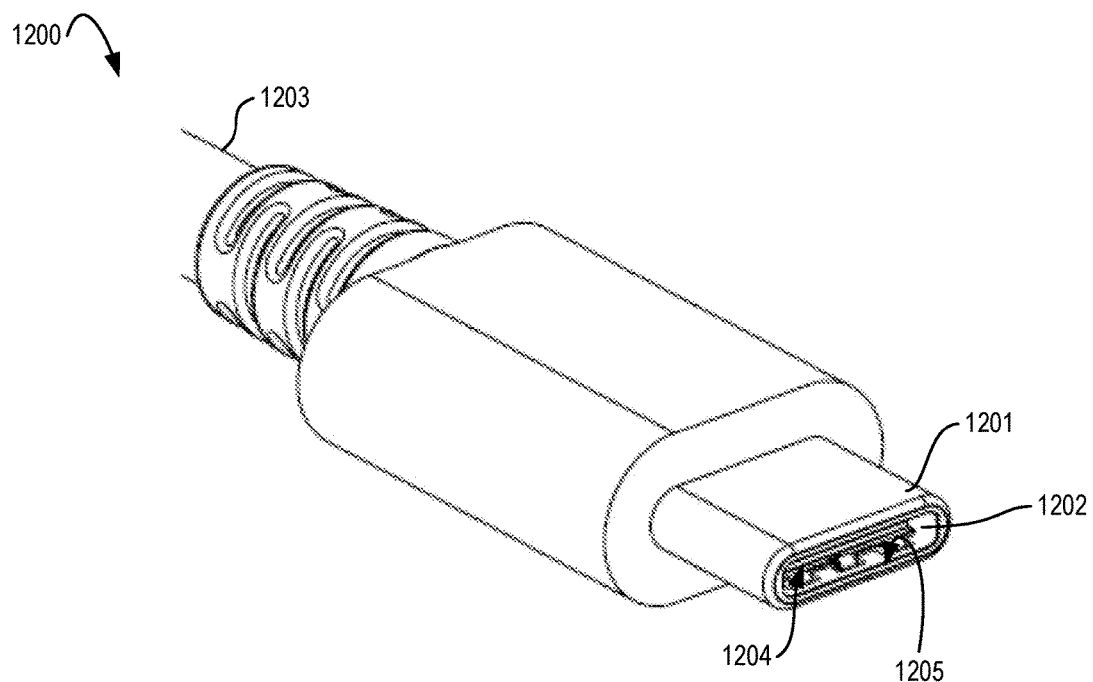
FIG. 12 illustrates a perspective view of a serial bus plug according to embodiments of the disclosure.

FIG. 12 illustrates a perspective view of a serial bus plug 1200 according to embodiments of the disclosure. In certain embodiments, serial bus plug may connect (e.g., physically and electrically) to a serial bus receptacle (e.g., serial bus receptacle 1000).

Figure 13:
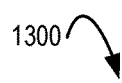
FIG. 13 illustrates a schematic diagram of the pins of a serial bus plug according to embodiments of the disclosure.

FIG. 13 illustrates a schematic diagram 1300 of the pins of a serial bus plug (e.g., serial bus plug 1200) according to embodiments of the disclosure.

In certain embodiments, a serial bus plug is flip-able between a right-side up position and an upside-down position (relative to the receptacle it is to be inserted into). In certain embodiments, (e.g., serial bus) plug 1200 of FIG. 12 slides within (e.g., serial bus) receptacle 1000 of FIG. 10, e.g., the housing 1201 slides within the shell 1001 (e.g., enclosure). Tongue 1002 may be (e.g., fixedly) disposed within the bore of the shell 1001 of the serial bus receptacle. Depicted tongue 1002 includes a first (e.g., substantially planar) side 1004 and an opposing second (e.g., substantially planar) side 1005. In one embodiment, first side 1004 is (e.g., substantially) parallel to the second side 1005. One or both of first side 1004 and second side 1005 may include electrical contacts (e.g., pins, pads, springs, etc.) thereon, e.g., facing in opposing directions. A longitudinal axis of each electrical contact may extend from the rear of shell 1001 towards the opening at the front of shell 1001, for example, along the first side 1004 and/or the second side 1005. A leading edge 1003 of the tongue 1002 may be (e.g., substantially) perpendicular to the first side 1004 and the second side 1005. The body of the tongue 1002, e.g., excluding any electrical contacts thereon, may be a non-conductive material, for example, glass-filled nylon. The leading edge 1003 of the tongue 1002 may not include any electrical contacts to mate with the electrical (for example, signal and/or data, e.g., but not ground) contacts of a plug. The back wall of the receptacle may not include any electrical contacts to mate with the electrical (for example, signal and/or data, e.g., but not ground) contacts of a plug. First side 1004 may include (e.g., only) a first row of electrical contacts thereon, for example, the electrical contacts (e.g., pins) in FIG. 11, e.g., pins A1-A12. Second side 1005 may include (e.g., only) a second row of electrical contacts thereon, for example, the electrical contacts (e.g., pins) in FIG. 11, e.g., pins B12-B1. Electrical contacts may physically connect (e.g., fixedly connect) to the circuitry of a device, e.g., a multiple role togging circuit or other circuitry discussed herein.

Turning again to FIG. 12, in certain embodiments, the serial bus plug 1200 includes a housing 1201 with a bore therein, e.g., having an opening at the front of the housing 1201 and a back wall opposite of the opening. Housing 1201 may include electrical contacts in the bore thereof. A first side 1204 of the interior of the housing may be (e.g., substantially) parallel to a second side 1205 of the interior of the housing of the serial bus plug 1200. One or both of first side 1204 and second side 1205 may include electrical contacts (e.g., pins, pads, springs, etc.) thereon, e.g., facing each other. Contacts on the first side 1204 and/or the second side 1205 may couple (e.g., physically and electrically connect) to the first side 1004 and/or the second side 1005 of receptacle 1000. In one embodiment, a first side 1204 of plug 1200 couples with either of the first side 1004 and the second side 1005 of the receptacle 1000 and the second side 1205 of the plug 1200 couples with the other of the first side 1004 and the second side 1005 of the receptacle 1000 (e.g., flip-able). A longitudinal axis of each electrical contact may extend from the rear of housing 1201 towards the opening 1202 at the front of housing 1201, for example, along the first side 1204 and/or the second side 1205. Housing 1201 may be slidably received within an (e.g., continuous) annulus formed between the exterior surface of the tongue 1002 and an interior surface of the shell 1001 of the receptacle 1000. The leading edge of the housing 1201 not include any electrical contacts to mate with the electrical (for example, signal and/or data, e.g., but not ground) contacts of a receptacle. The back wall of the housing 1201 may not include any electrical contacts to mate with the electrical (for example, signal and/or data, e.g., but not ground) contacts of a receptacle. First side 1204 may include (e.g., only) a first row of electrical contacts thereon, for example, the electrical contacts (e.g., pins) in FIG. 13, e.g., pins A12-A1. Second side 1205 may include (e.g., only) a second row of electrical contacts thereon, for example, the electrical contacts (e.g., pins) in FIG. 13, e.g., pins B1-B12. Electrical contacts may physically connect (e.g., fixedly connect) to a cable 1203 or other electrical conductors (for example, wires to a memory device, e.g., a USB memory stick). Cable 1203 may connect to another plug, e.g., to connect to a receptacle that physically connects to the circuitry of a device, e.g., a multiple role togging circuit or other circuitry discussed herein.

Circuitry here may include a transmitter and/or a receiver to send and receive data, respectively, e.g., as part of a transceiver (e.g., a physical layer (PHY) circuit).

In one embodiment, an apparatus (e.g., a circuit) includes a serial bus receptacle to receive a serial bus plug of a device; a first transceiver electrically coupled to the serial bus receptacle; a multiple role toggling circuit to toggle the first transceiver between a first role and a second role, wherein the device comprises a second transceiver to toggle between a first role and a second role; and a randomizer circuit to cause a plurality of different, toggling duty cycles to be applied to the multiple role toggling circuit. The randomizer circuit may cause a plurality of different, toggling frequencies and the plurality of different, toggling duty cycles to be applied to the multiple role toggling circuit. The randomizer circuit may cause each of a plurality of configuration channel pins of the serial bus receptacle to provide a role indicator from the multiple role toggling circuit. The role indicator may include an exposed pull-up resistor. The first role and the second role of the first transceiver may be (e.g., only) data roles. The first role and the second role of the first transceiver may be (e.g., only) power roles. The first role and the second role of the first transceiver may be power and data roles. The randomizer circuit may cause each of the plurality of different, toggling duty cycles to be within a minimum toggling duty cycle and a maximum toggling duty cycle of a Universal Serial Bus (USB) specification.

In another embodiment, an apparatus (e.g., a circuit) includes a serial bus receptacle to receive a serial bus plug of a device; a first transceiver electrically coupled to the serial bus receptacle; a multiple role toggling circuit to toggle the first transceiver between a first role and a second role, wherein the device comprises a second transceiver to toggle between a first role and a second role; and a randomizer circuit to cause a plurality of different, toggling frequencies to be applied to the multiple role toggling circuit. The randomizer circuit may cause a plurality of different, toggling duty cycles and the plurality of different, toggling frequencies to be applied to the multiple role toggling circuit. The randomizer circuit may cause each of a plurality of configuration channel pins of the serial bus receptacle to provide a role indicator from the multiple role toggling circuit. The role indicator may include an exposed pull-up resistor. The first role and the second role of the first transceiver may be (e.g., only) data roles. The first role and the second role of the first transceiver may be (e.g., only) power roles. The first role and the second role of the first transceiver may be power and data roles. The randomizer circuit may cause each of the plurality of different, toggling frequencies to be within a minimum toggling frequency and a maximum toggling frequency of a Universal Serial Bus (USB) specification.

In yet another embodiment, an apparatus (e.g., a circuit) includes a serial bus receptacle to receive a serial bus plug of a device; a first transceiver electrically coupled to the serial bus receptacle; a multiple role toggling circuit to toggle the first transceiver between an upstream facing data port role and a downstream facing data port role, wherein the device comprises a second transceiver to toggle between an upstream facing data port role and a downstream facing data port role; and a randomizer circuit to cause a plurality of different, toggling duty cycles and/or a plurality of different, toggling frequencies to be applied to the multiple role toggling circuit. The randomizer circuit may cause each of a plurality of configuration channel pins of the serial bus receptacle to provide a role indicator from the multiple role toggling circuit. The role indicator may include an exposed pull-down resistor for the upstream facing data port role and/or an exposed pull-up resistor for the downstream facing data port role. The randomizer circuit may cause each of the plurality of different, toggling duty cycles to be applied within a minimum toggling duty cycle and a maximum toggling duty cycle of a Universal Serial Bus (USB) specification and each of the plurality of different, toggling frequencies to be applied within a minimum toggling frequency and a maximum toggling frequency of the USB specification.

In another embodiment, an apparatus (e.g., a circuit) includes a serial bus receptacle to receive a serial bus plug of a device; a power supply electrically coupled to the serial bus receptacle; a multiple role toggling circuit to toggle the power supply between a power source role and a power sink role, wherein the device comprises a second power supply to toggle between a power source role and a power sink role; and a randomizer circuit to cause a plurality of different, toggling duty cycles and/or a plurality of different, toggling frequencies to be applied to the multiple role toggling circuit. The randomizer circuit may cause each of a plurality of configuration channel pins of the serial bus receptacle to provide a role indicator from the multiple role toggling circuit. The role indicator may include an exposed pull-up resistor for the power source role and/or an exposed pull-down resistor for the power sink role. The randomizer circuit may cause each of the plurality of different, toggling duty cycles to be applied within a minimum toggling duty cycle and a maximum toggling duty cycle of a Universal Serial Bus (USB) specification and each of the plurality of different, toggling frequencies to be applied within a minimum toggling frequency and a maximum toggling frequency of a Universal Serial Bus (USB) specification.

In one embodiment, an apparatus (e.g., a circuit) includes a serial bus receptacle to receive a serial bus plug of a device; a first transceiver electrically coupled to the serial bus receptacle; a multiple role toggling means to toggle the first transceiver between a first role and a second role, wherein the device comprises a second transceiver to toggle between a first role and a second role; and randomizer means to cause a plurality of different, toggling duty cycles to be applied to the multiple role toggling means.

In another embodiment, an apparatus (e.g., a circuit) includes a serial bus receptacle to receive a serial bus plug of a device; a first transceiver electrically coupled to the serial bus receptacle; a multiple role toggling means to toggle the first transceiver between a first role and a second role, wherein the device comprises a second transceiver to toggle between a first role and a second role; and a randomizer means to cause a plurality of different, toggling frequencies to be applied to the multiple role toggling means.

In yet another embodiment, an apparatus (e.g., a circuit) includes a serial bus receptacle to receive a serial bus plug of a device; a first transceiver electrically coupled to the serial bus receptacle; a multiple role toggling means to toggle the first transceiver between an upstream facing data port role and a downstream facing data port role, wherein the device comprises a second transceiver to toggle between an upstream facing data port role and a downstream facing data port role; and a randomizer means to cause a plurality of different, toggling duty cycles and/or a plurality of different, toggling frequencies to be applied to the multiple role toggling means.

In another embodiment, an apparatus (e.g., a circuit) includes a serial bus receptacle to receive a serial bus plug of a device; a power supply electrically coupled to the serial bus receptacle; a multiple role toggling means to toggle the power supply between a power source role and a power sink role, wherein the device comprises a second power supply to toggle between a power source role and a power sink role; and a randomizer means to cause a plurality of different, toggling duty cycles and/or a plurality of different, toggling frequencies to be applied to the multiple role toggling means.

In yet another embodiment, an apparatus comprises a data storage device that stores code that when executed by a hardware processor causes the hardware processor to perform any method disclosed herein. An apparatus may be as described in the detailed description. A method may be as described in the detailed description.

In another embodiment, a non-transitory machine readable medium that stores code that when executed by a machine causes the machine to perform a method comprising any method disclosed herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality of Service (QoS), Hot-Plug/Hot-Swap support, Data Integrity, and Error Handling are among some of the advanced features supported by PCI Express.

Figure 14:
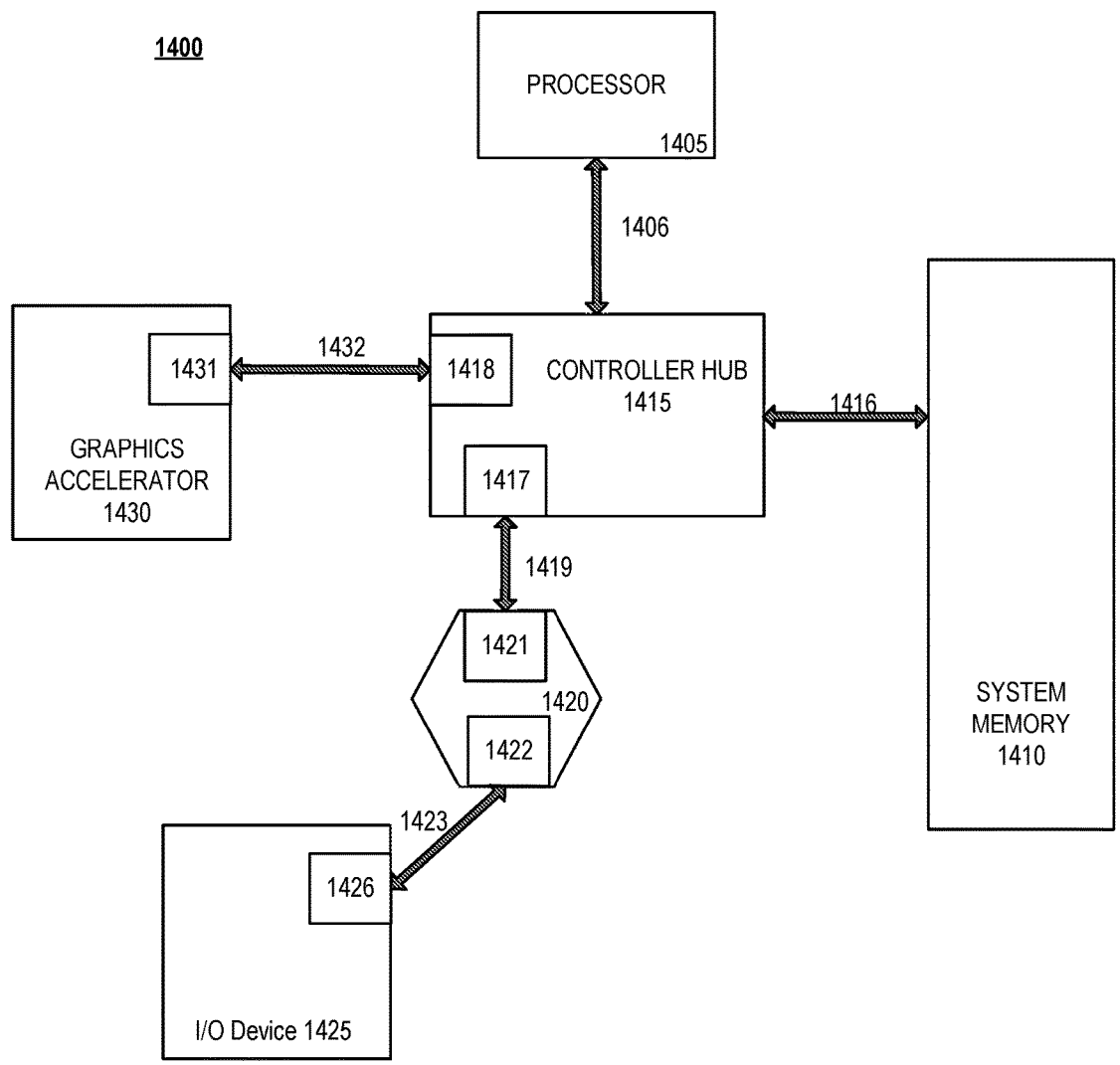
FIG. 14 illustrates a computing system including a peripheral component interconnect express (PCIe) compliant architecture according to embodiments of the disclosure.

Referring to FIG. 14, an embodiment of a fabric composed of point-to-point Links that interconnect a set of components is illustrated. System 1400 includes processor 1405 and system memory 1410 coupled to controller hub 1415. Processor 1405 includes any processing element, such as a microprocessor, a host processor, an embedded processor, a coprocessor, or other processor. Processor 1405 is coupled to controller hub 1415 through front-side bus (FSB) 1406. In one embodiment, FSB 1406 is a serial point-to-point interconnect as described below. In another embodiment, link 1406 includes a serial, differential interconnect architecture that is compliant with different interconnect standard.

System memory 1410 includes any memory device, such as random access memory (RAM), non-volatile (NV) memory, or other memory accessible by devices in system 1400. System memory 1410 is coupled to controller hub 1415 through memory interface 1416. Examples of a memory interface include a double-data rate (DDR) memory interface, a dual-channel DDR memory interface, and a dynamic RAM (DRAM) memory interface.

In one embodiment, controller hub 1415 is a root hub, root complex, or root controller in a Peripheral Component Interconnect Express (PCIe or PCIE) interconnection hierarchy. Examples of controller hub 1415 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 1405, while controller 1415 is to communicate with I/O devices, in a similar manner as described below. In some embodiments, peer-to-peer routing is optionally supported through root complex 1415.

Here, controller hub 1415 is coupled to switch/bridge 1420 through serial link 1419. Input/output modules 1417 and 1421, which may also be referred to as interfaces/ports 1417 and 1421, include/implement a layered protocol stack to provide communication between controller hub 1415 and switch 1420. In one embodiment, multiple devices are capable of being coupled to switch 1420.

Switch/bridge 1420 routes packets/messages from device 1425 upstream, e.g., up a hierarchy towards a root complex, to controller hub 1415 and downstream, e.g., down a hierarchy away from a root controller, from processor 1405 or system memory 1410 to device 1425. Switch 1420, in one embodiment, is referred to as a logical assembly of multiple virtual PCI-to-PCI bridge devices. Device 1425 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1425 may include a PCIe to PCI/PCI-X bridge to support legacy or other version PCI devices. Endpoint devices in PCIe are often classified as legacy, PCIe, or root complex integrated endpoints.

Graphics accelerator 1430 is also coupled to controller hub 1415 through serial link 1432. In one embodiment, graphics accelerator 1430 is coupled to an MCH, which is coupled to an ICH. Switch 1420, and accordingly to I/O device 1425 through serial link 1423, is then coupled to the ICH. I/O modules 1431 and 1418 are also to implement a layered protocol stack to communicate between graphics accelerator 1430 and controller hub 1415. Similar to the MCH discussion above, a graphics controller or the graphics accelerator 1430 itself may be integrated in processor 1405.

Figure 15:
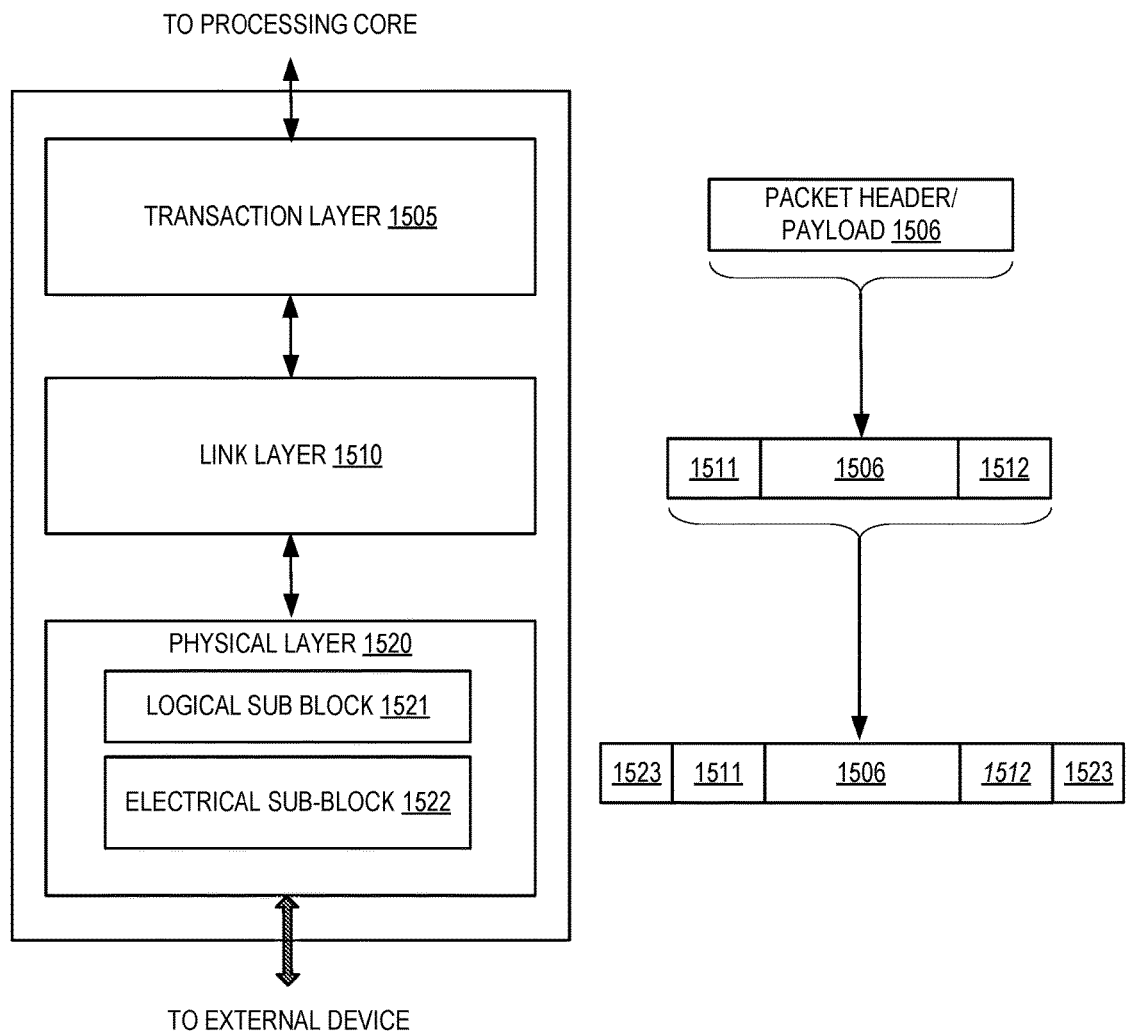
FIG. 15 illustrates a PCIe compliant interconnect architecture including a layered stack according to embodiments of the disclosure.

Turning to FIG. 15 an embodiment of a layered protocol stack is illustrated. Layered protocol stack 1500 includes any form of a layered communication stack, such as a Quick Path Interconnect (QPI) stack, a PCIe stack, a next generation high performance computing interconnect stack, or other layered stack. Although the discussion immediately below in reference to FIGS. 14-17 are in relation to a PCIe stack, the same concepts may be applied to other interconnect stacks. In one embodiment, protocol stack 1500 is a PCIe protocol stack including transaction layer 1505, link layer 1510, and physical layer 1520. An interface, such as interfaces 1417, 1418, 1421, 1422, 1426, and 1431 in FIG. 14, may be represented as communication protocol stack 1500. Representation as a communication protocol stack may also be referred to as a module or interface implementing/including a protocol stack.

PCI Express uses packets to communicate information between components. Packets are formed in the Transaction Layer 1505 and Data Link Layer 1510 to carry the information from the transmitting component to the receiving component. As the transmitted packets flow through the other layers, they are extended with additional information necessary to handle packets at those layers. At the receiving side the reverse process occurs and packets get transformed from their Physical Layer 1520 representation to the Data Link Layer 1510 representation and finally (for Transaction Layer Packets) to the form that can be processed by the Transaction Layer 1505 of the receiving device.

Transaction Layer

In one embodiment, transaction layer 1505 is to provide an interface between a device's processing core and the interconnect architecture, such as data link layer 1510 and physical layer 1520. In this regard, a primary responsibility of the transaction layer 1505 is the assembly and disassembly of packets (e.g., transaction layer packets, or TLPs). The translation layer 1505 typically manages credit-base flow control for TLPs. PCIe implements split transactions, e.g., transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1505. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1505 assembles packet header/payload 1506. Format for current packet headers/payloads may be found in the PCIe specification at the PCIe specification website.

Figure 16:
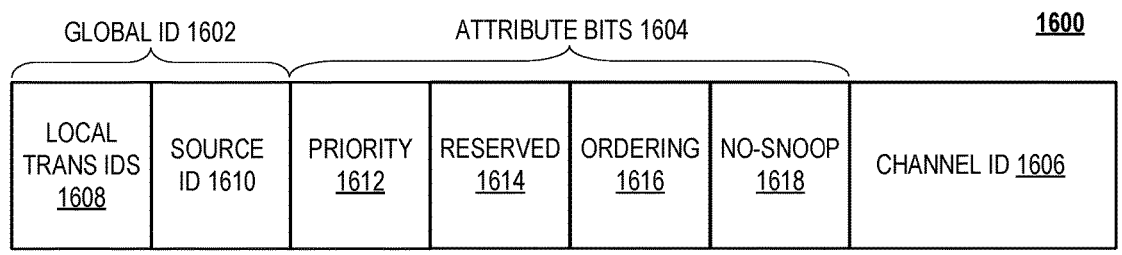
FIG. 16 illustrates a PCIe compliant request or packet to be generated or received within an interconnect architecture according to embodiments of the disclosure.

Referring to FIG. 16, an embodiment of a PCIe transaction descriptor is illustrated. In one embodiment, transaction descriptor 1600 is a mechanism for carrying transaction information. In this regard, transaction descriptor 1600 supports identification of transactions in a system. Other potential uses include tracking modifications of default transaction ordering and association of transaction with channels.

Transaction descriptor 1600 includes global identifier field 1602, attributes field 1604 and channel identifier field 1606. In the illustrated example, global identifier field 1602 is depicted comprising local transaction identifier field 1608 and source identifier field 1610. In one embodiment, global transaction identifier 1602 is unique for all outstanding requests.

According to one implementation, local transaction identifier field 1608 is a field generated by a requesting agent, and it is unique for all outstanding requests that require a completion for that requesting agent. Furthermore, in this example, source identifier 1610 uniquely identifies the requestor agent within a PCIe hierarchy. Accordingly, together with source ID 1610, local transaction identifier 1608 field provides global identification of a transaction within a hierarchy domain.

Attributes field 1604 specifies characteristics and relationships of the transaction. In this regard, attributes field 1604 is potentially used to provide additional information that allows modification of the default handling of transactions. In one embodiment, attributes field 1604 includes priority field 1612, reserved field 1614, ordering field 1616, and no-snoop field 1618. Here, priority sub-field 1612 may be modified by an initiator to assign a priority to the transaction. Reserved attribute field 1614 is left reserved for future, or vendor-defined usage. Possible usage models using priority or security attributes may be implemented using the reserved attribute field.

In this example, ordering attribute field 1616 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1618 is utilized to determine if transactions are snooped. As shown, channel ID Field 1606 identifies a channel that a transaction is associated with.

Link Layer

Link layer 1510, also referred to as data link layer 1510, acts as an intermediate stage between transaction layer 1505 and the physical layer 1520. In one embodiment, a responsibility of the data link layer 1510 is providing a reliable mechanism for exchanging Transaction Layer Packets (TLPs) between two components a link. One side of the Data Link Layer 1510 accepts TLPs assembled by the Transaction Layer 1505, applies packet sequence identifier 1511, e.g., an identification number or packet number, calculates and applies an error detection code, e.g., CRC 1512, and submits the modified TLPs to the Physical Layer 1520 for transmission across a physical to an external device.

Physical Layer

In one embodiment, physical layer 1520 includes logical sub block 1521 and electrical sub-block 1522 to physically transmit a packet to an external device. Here, logical sub-block 1521 is responsible for the "digital" functions of Physical Layer 1521. In this regard, the logical sub-block includes a transmit section to prepare outgoing information for transmission by physical sub-block 1522, and a receiver section to identify and prepare received information before passing it to the Link Layer 1510.

Physical block 1522 includes a transmitter and a receiver. The transmitter is supplied by logical sub-block 1521 with symbols, which the transmitter serializes and transmits onto to an external device. The receiver is supplied with serialized symbols from an external device and transforms the received signals into a bit-stream. The bit-stream is de-serialized and supplied to logical sub-block 1521. In one embodiment, an 8 b/10 b transmission code is employed, where ten-bit symbols are transmitted/received. Here, special symbols are used to frame a packet with frames 1523. In addition, in one example, the receiver also provides a symbol clock recovered from the incoming serial stream.

As stated above, although transaction layer 1505, link layer 1510, and physical layer 1520 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, e.g., a transaction layer; a second layer to sequence packets, e.g., a link layer; and a third layer to transmit the packets, e.g., a physical layer. As a specific example, a common standard interface (CSI) layered protocol is utilized.

Figure 17:
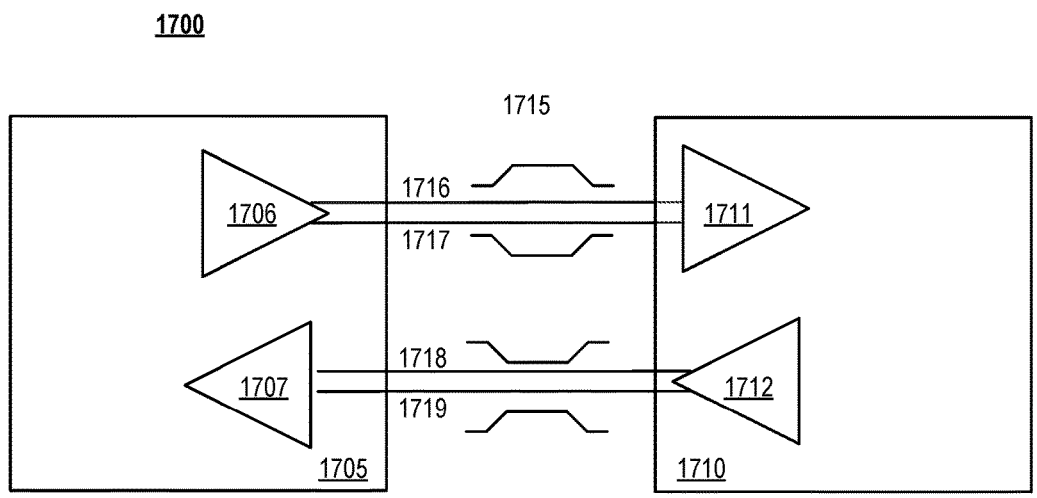
FIG. 17 illustrates a transmitter and receiver pair for a PCIe compliant interconnect architecture according to embodiments of the disclosure.

Referring next to FIG. 17, an embodiment of a PCIe serial point to point fabric 1700 is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1706/1711 and a receive pair 1712/1707. Accordingly, device 1705 includes transmission logic 1706 to transmit data to device 1710 and receiving logic 1707 to receive data from device 1710. In other words, two transmitting paths, e.g., paths 1716 and 1717, and two receiving paths, e.g., paths 1718 and 1719, are included in a PCIe link.

A transmission path refers to any path for transmitting data, such as a transmission line, a copper line, an optical line, a wireless communication channel, an infrared communication link, or other communication path. A connection between two devices, such as device 1705 and device 1710, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1716 and 1717, to transmit differential signals. As an example, when line 1716 toggles from a low voltage level to a high voltage level, e.g., a rising edge, line 1717 drives from a high logic level to a low logic level, e.g., a falling edge. Differential signals potentially demonstrate better electrical characteristics, such as better signal integrity, e.g., cross-coupling, voltage overshoot/undershoot, ringing, etc. This allows for better timing window, which enables faster transmission frequencies.

Figure 18:
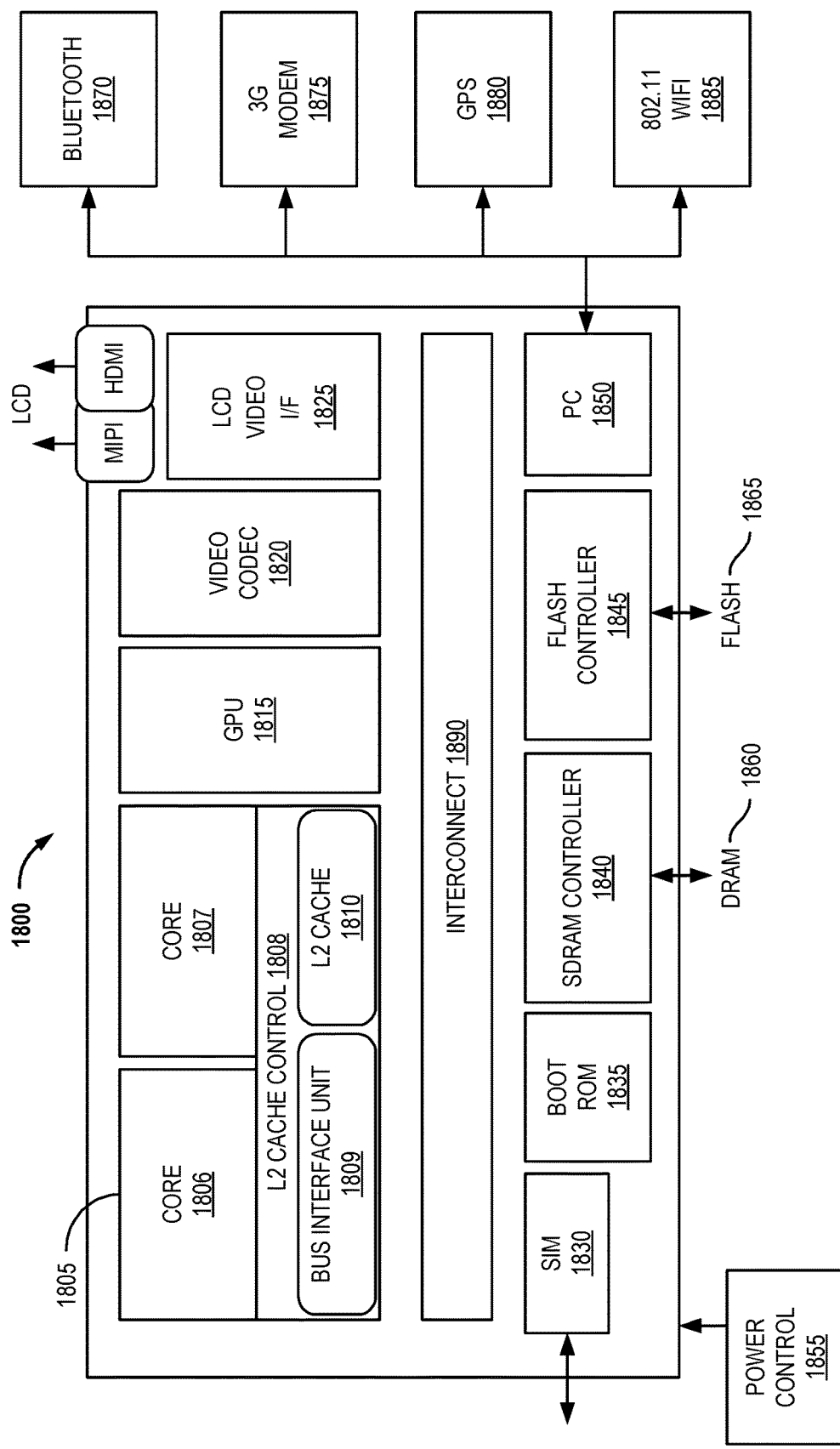
FIG. 18 illustrates a computing system on a chip according to embodiments of the disclosure.

Turning next to FIG. 18, an embodiment of a system on-chip (SOC) design in accordance with the embodiments is depicted. As a specific illustrative example, SOC 1800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1800 includes 2 cores—1806 and 1807. Similar to the discussion above, cores 1806 and 1807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1806 and 1807 are coupled to cache control 1808 that is associated with bus interface unit 1809 and L2 cache 1810 to communicate with other parts of system 1800. Interconnect 1890 includes an on-chip interconnect, such as an IOSF, AMBA, or other interconnect discussed above, which potentially implements one or more aspects of the described embodiments.

Interconnect 1890 provides communication channels to the other components, such as a Subscriber Identity Module (SIM) 1830 to interface with a SIM card, a boot ROM 1835 to hold boot code for execution by cores 1806 and 1807 to initialize and boot SOC 1800, a SDRAM controller 1840 to interface with external memory (e.g. DRAM 1860), a flash controller 1845 to interface with non-volatile memory (e.g. Flash 1865), a peripheral control 1850 (e.g. Serial Peripheral Interface) to interface with peripherals, video codecs 1820 and Video interface 1825 to display and receive input (e.g. touch enabled input), GPU 1815 to perform graphics related computations, etc. Any of these interfaces may incorporate aspects of the embodiments described herein.

In addition, the system illustrates peripherals for communication, such as a Bluetooth module 1870, 3G modem 1875, GPS 1880, and WiFi 1885. Note as stated above, a UE includes a radio for communication. As a result, these peripheral communication modules are not all required. However, in a UE some form a radio for external communication is to be included.

Note that the apparatus, methods, and systems described above may be implemented in any electronic device or system as aforementioned. As specific illustrations, the figures below provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 19:
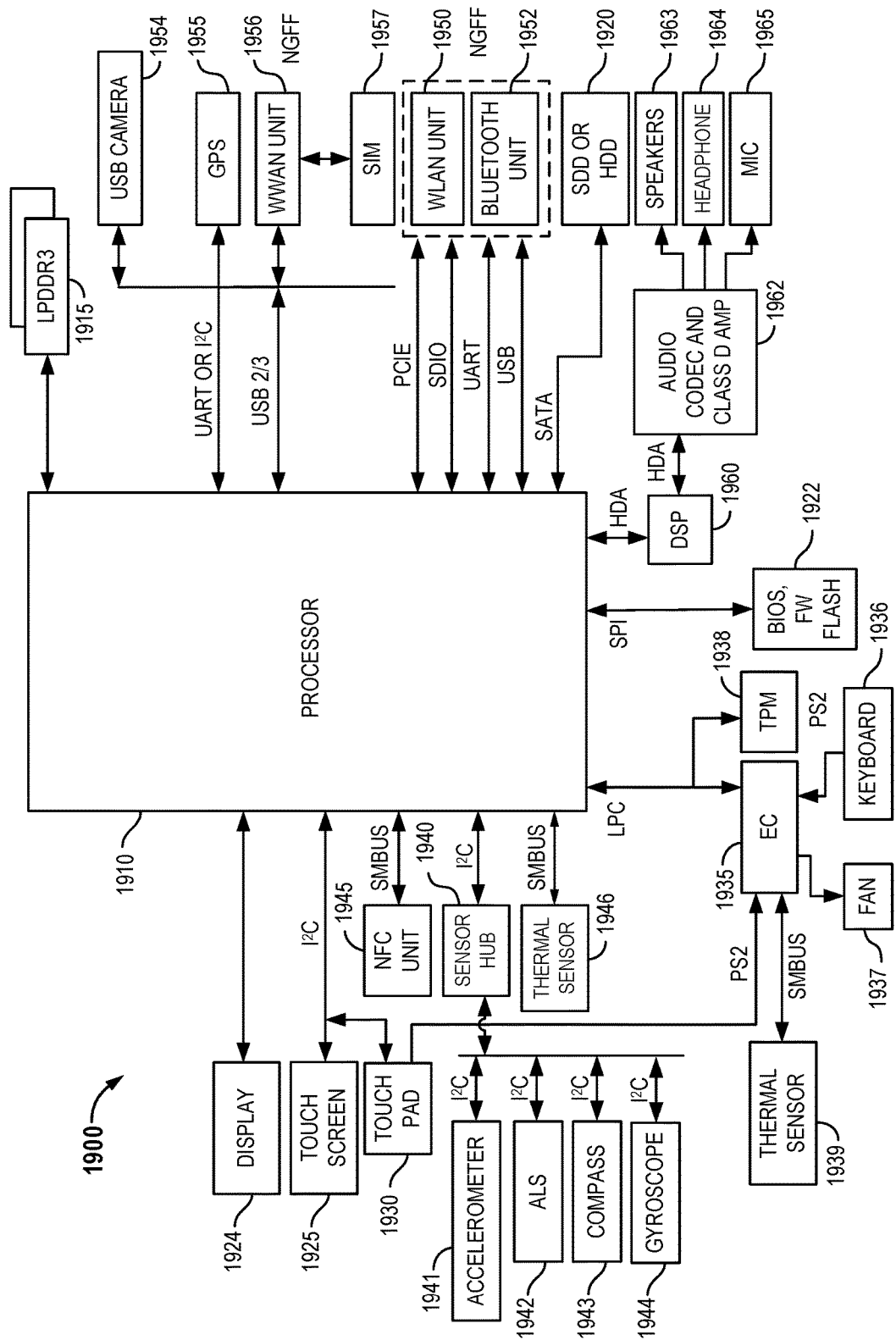
FIG. 19 illustrates an embodiment of a block diagram for a computing system.

Referring now to FIG. 19, a block diagram of components present in a computer system in accordance with embodiments of the disclosure is illustrated. As shown in FIG. 19, system 1900 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 19 is intended to show a high level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 19, a processor 1910, in one embodiment, includes a microprocessor, multi-core processor, multi-threaded processor, an ultra low voltage processor, an embedded processor, or other known processing element. In the illustrated implementation, processor 1910 acts as a main processing unit and central hub for communication with many of the various components of the system 1900. As one example, processor 1910 is implemented as a system on a chip (SoC). As a specific illustrative example, processor 1910 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1910 in one implementation will be discussed further below to provide an illustrative example.

Processor 1910, in one embodiment, communicates with a system memory 1915. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1920 may also couple to processor 1910. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 19, a flash device 1922 may be coupled to processor 1910, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1900. Specifically shown in the embodiment of FIG. 19 is a display 1924 which may be a high definition LCD or LED panel configured within a lid portion of the chassis. This display panel may also provide for a touch screen 1925, e.g., adapted externally over the display panel such that via a user's interaction with this touch screen, user inputs can be provided to the system to enable desired operations, e.g., with regard to the display of information, accessing of information and so forth. In one embodiment, display 1924 may be coupled to processor 1910 via a display interconnect that can be implemented as a high performance graphics interconnect. Touch screen 1925 may be coupled to processor 1910 via another interconnect, which in an embodiment can be an I$^2$C interconnect. As further shown in FIG. 19, in addition to touch screen 1925, user input by way of touch can also occur via a touch pad 1930 which may be configured within the chassis and may also be coupled to the same I$^2$C interconnect as touch screen 1925.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1910 in different manners. Certain inertial and environmental sensors may couple to processor 1910 through a sensor hub 1940, e.g., via an I²C interconnect. In the embodiment shown in FIG. 19, these sensors may include an accelerometer 1941, an ambient light sensor (ALS) 1942, a compass 1943 and a gyroscope 1944. Other environmental sensors may include one or more thermal sensors 1946 which in some embodiments couple to processor 1910 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 19, various peripheral devices may couple to processor 1910 via a low pin count (LPC) interconnect. In the embodiment shown, various components can be coupled through an embedded controller (EC) 1935. Such components can include a keyboard 1936 (e.g., coupled via a PS2 interface), a fan 1937, and a thermal sensor 1939. In some embodiments, touch pad 1930 may also couple to EC 1935 via a PS2 interface. In addition, a security processor such as a trusted platform module (TPM) 1938 in accordance with the Trusted Computing Group (TCG) TPM Specification Version 1.2, dated Oct. 2, 2003, may also couple to processor 1910 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with a Universal Serial Bus specification, with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1900 can communicate with external devices in a variety of manners, including wirelessly. In the embodiment shown in FIG. 19, various wireless modules, each of which can correspond to a radio configured for a particular wireless communication protocol, are present. One manner for wireless communication in a short range such as a near field may be via a near field communication (NFC) unit 1945 which may communicate, in one embodiment with processor 1910 via an SMBus. Note that via this NFC unit 1945, devices in close proximity to each other can communicate. For example, a user can enable system 1900 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 19, additional wireless units can include other short range wireless engines including a WLAN unit 1950 and a Bluetooth unit 1952. Using WLAN unit 1950, Wi-Fi™ communications in accordance with a given Institute of Electrical and Electronics Engineers (IEEE) 802.11 standard can be realized, while via Bluetooth unit 1952, short range communications via a Bluetooth protocol can occur. These units may communicate with processor 1910 via, e.g., a USB link or a universal asynchronous receiver transmitter (UART) link. Or these units may couple to processor 1910 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1956 which in turn may couple to a subscriber identity module (SIM) 1957. In addition, to enable receipt and use of location information, a GPS module 1955 may also be present. Note that in the embodiment shown in FIG. 19, WWAN unit 1956 and an integrated capture device such as a camera module 1954 may communicate via a given USB protocol, e.g., USB 2.0 or 3.0 link, or a UART or I$^2$C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1960, which may couple to processor 1910 via a high definition audio (HDA) link. Similarly, DSP 1960 may communicate with an integrated coder/decoder (CODEC) and amplifier 1962 that in turn may couple to output speakers 1963 which may be implemented within the chassis. Similarly, amplifier and CODEC 1962 can be coupled to receive audio inputs from a microphone 1965 which in an embodiment can be implemented via dual array microphones (such as a digital microphone array) to provide for high quality audio inputs to enable voice-activated control of various operations within the system. Note also that audio outputs can be provided from amplifier/CODEC 1962 to a headphone jack 1964. Although shown with these particular components in the embodiment of FIG. 19, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1910 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1935. This sustain power plane also powers an on-die voltage regulator that supports the onboard SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1635 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 16, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C.). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 20:
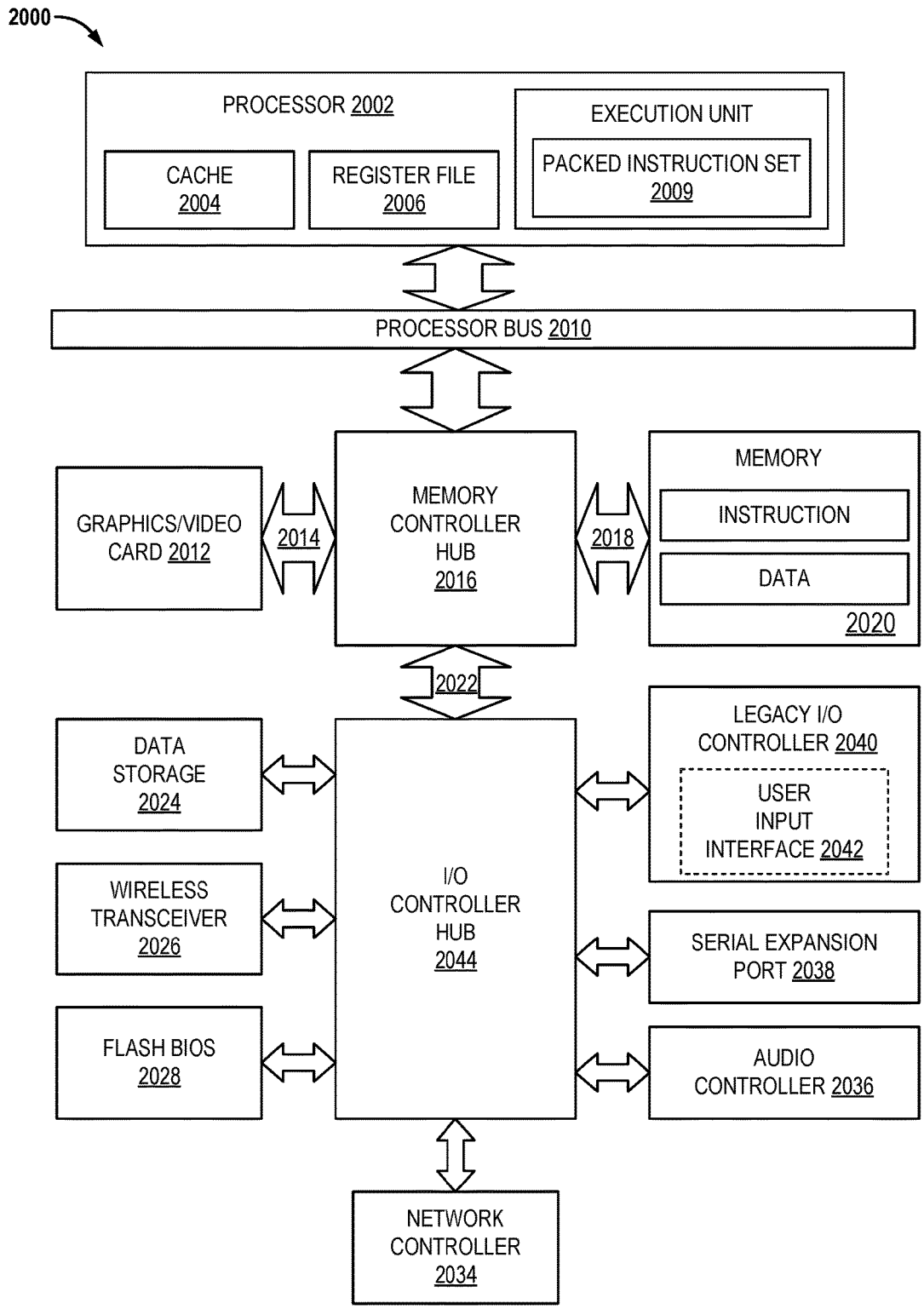
FIG. 20 illustrates another embodiment of a block diagram for a computing system.

Turning to FIG. 20, a block diagram of an exemplary computer system formed with a processor that includes execution units to execute an instruction, where one or more of the interconnects implement one or more features in accordance with embodiments of the disclosure is illustrated. System 2000 includes a component, such as a processor 2002 to employ execution units including logic to perform algorithms for process data, in accordance with the present disclosure, such as in the embodiment described herein. System 2000 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 2000 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 2002 includes one or more execution units 2008 to implement an algorithm that is to perform at least one instruction. One embodiment may be described in the context of a single processor desktop or server system, but alternative embodiments may be included in a multiprocessor system. System 2000 is an example of a 'hub' system architecture. The computer system 2000 includes a processor 2002 to process data signals. The processor 2002, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 2002 is coupled to a processor bus 2010 that transmits data signals between the processor 2002 and other components in the system 2000. The elements of system 2000 (e.g. graphics accelerator 2012, memory controller hub 2016, memory 2020, I/O controller hub 2044, wireless transceiver 2026, Flash BIOS 2028, Network controller 2034, Audio controller 2036, Serial expansion port 2038, I/O controller 2040, etc.) perform their conventional functions that are well known to those familiar with the art.

In one embodiment, the processor 2002 includes a Level 1 (L1) internal cache memory 2004. Depending on the architecture, the processor 2002 may have a single internal cache or multiple levels of internal caches. Other embodiments include a combination of both internal and external caches depending on the particular implementation and needs. Register file 2006 is to store different types of data in various registers including integer registers, floating point registers, vector registers, banked registers, shadow registers, checkpoint registers, status registers, and instruction pointer register.

Execution unit 2008, including logic to perform integer and floating point operations, also resides in the processor 2002. The processor 2002, in one embodiment, includes a microcode (μcode) ROM to store microcode, which when executed, is to perform algorithms for certain macroinstructions or handle complex scenarios. Here, microcode is potentially updateable to handle logic bugs/fixes for processor 2002. For one embodiment, execution unit 2008 includes logic to handle a packed instruction set 2009. By including the packed instruction set 2009 in the instruction set of a general-purpose processor 2002, along with associated circuitry to execute the instructions, the operations used by many multimedia applications may be performed using packed data in a general-purpose processor 2002. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 2008 may also be used in micro controllers, embedded processors, graphics devices, DSPs, and other types of logic circuits. System 2000 includes a memory 2020. Memory 2020 includes a dynamic random access memory (DRAM) device, a static random access memory (SRAM) device, flash memory device, or other memory device. Memory 2020 stores instructions and/or data represented by data signals that are to be executed by the processor 2002.

Note that any of the aforementioned features or aspects of the embodiments of the disclosure may be utilized on one or more interconnect illustrated in FIG. 20. For example, an on-die interconnect (ODI), which is not shown, for coupling internal units of processor 2002 implements one or more aspects of the disclosure herein. Or the embodiments of the disclosure are associated with a processor bus 2010 (e.g. Intel Quick Path Interconnect (QPI) or other known high performance computing interconnect), a high bandwidth memory path 2018 to memory 2020, a point-to-point link 2014 to graphics accelerator 2012 (e.g. a Peripheral Component Interconnect express (PCIe) compliant fabric), a controller hub interconnect 2022, an I/O or other interconnect (e.g. USB, PCI, PCIe) for coupling the other illustrated components. Some examples of such components include the audio controller 2036, firmware hub (flash BIOS) 2028, wireless transceiver 2026, data storage 2024, legacy I/O controller 2010 containing user input and keyboard interfaces 2042, a serial expansion port 2038 such as Universal Serial Bus (USB), and a network controller 2034. The data storage device 2024 can comprise a hard disk drive, a floppy disk drive, a CD-ROM device, a flash memory device, or other mass storage device.

Figure 21:
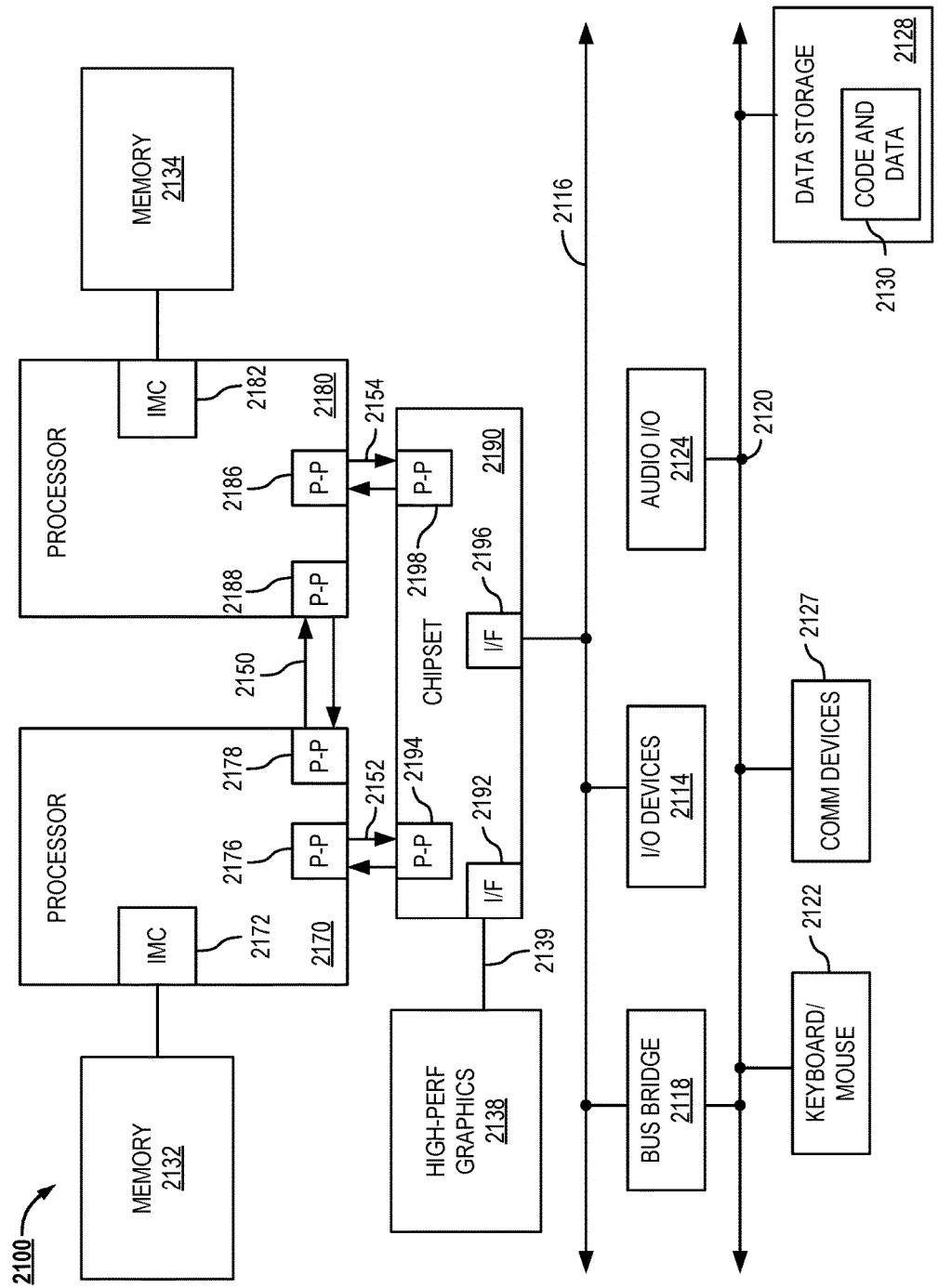
FIG. 21 illustrates another embodiment of a block diagram for a computing system.

Referring now to FIG. 21, shown is a block diagram of a second system 2100 in accordance with an embodiment of the present disclosure. As shown in FIG. 21, multiprocessor system 2100 is a point-to-point interconnect system, and includes a first processor 2170 and a second processor 2180 coupled via a point-to-point interconnect 2150. Each of processors 2170 and 2180 may be some version of a processor. In one embodiment, 2152 and 2154 are part of a serial, point-to-point coherent interconnect fabric, such as Intel's Quick Path Interconnect (QPI) architecture. As a result, embodiments of the disclosure may be implemented within the QPI architecture.

While shown with only two processors 2170, 2180, it is to be understood that the scope of the present disclosure is not so limited. In other embodiments, one or more additional processors may be present in a given processor.

Processors 2170 and 2180 are shown including integrated memory controller units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 each exchange information with a chipset 2190 via individual P-P interfaces 2152, 2154 using point to point interface circuits 2176, 2194, 2186, 2198. Chipset 2190 also exchanges information with a high-performance graphics circuit 2138 via an interface circuit 2192 along a high-performance graphics interconnect 2139.

A shared cache (not shown) may be included in either processor or outside of both processors; yet connected with the processors via P-P interconnect, such that either or both processors' local cache information may be stored in the shared cache if a processor is placed into a low power mode.

Chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of the present disclosure is not so limited.

As shown in FIG. 21, various I/O devices 2114 are coupled to first bus 2116, along with a bus bridge 2118 which couples first bus 2116 to a second bus 2120. In one embodiment, second bus 2120 includes a low pin count (LPC) bus. Various devices are coupled to second bus 2120 including, for example, a keyboard and/or mouse 2122, communication devices 2127 and a storage unit 2128 such as a disk drive or other mass storage device which often includes instructions/code and data 2130, in one embodiment. Further, an audio I/O 2124 is shown coupled to second bus 2120. Note that other architectures are possible, where the included components and interconnect architectures vary. For example, instead of the point-to-point architecture of FIG. 21, a system may implement a multi-drop bus or other such architecture.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

What is claimed is:

1. An apparatus comprising:
   a serial bus receptacle to receive a serial bus plug of a device;
   a first transceiver electrically coupled to the serial bus receptacle;
   a multiple role toggling circuit to toggle the first transceiver between a first role and a second role, wherein the device comprises a second transceiver to toggle between a first role and a second role; and
   a randomizer circuit to cause a plurality of different, toggling duty cycles to be applied to the multiple role toggling circuit to toggle the first transceiver between the first role for a first duty cycle and the second role for a second, different duty cycle.

2. The apparatus of claim 1, wherein the randomizer circuit is to cause a plurality of different, toggling frequencies and the plurality of different, toggling duty cycles to be applied to the multiple role toggling circuit.

3. The apparatus of claim 1, wherein the randomizer circuit is to cause each of a plurality of configuration channel pins of the serial bus receptacle to provide a role indicator from the multiple role toggling circuit.

4. The apparatus of claim 3, wherein the role indicator comprises an exposed pull-up resistor.

5. The apparatus of claim 1, wherein the first role and the second role of the first transceiver are data roles.

6. The apparatus of claim 1, wherein the first role and the second role of the first transceiver are power roles.

7. The apparatus of claim 1, wherein the first role and the second role of the first transceiver are power and data roles.

8. The apparatus of claim 1, wherein the randomizer circuit is to cause each of the plurality of different, toggling duty cycles to be within a minimum toggling duty cycle and a maximum toggling duty cycle of a Universal Serial Bus (USB) specification.

9. An apparatus comprising:
   a serial bus receptacle to receive a serial bus plug of a device;
   a first transceiver electrically coupled to the serial bus receptacle;
   a multiple role toggling circuit to toggle the first transceiver between a first role and a second role, wherein the device comprises a second transceiver to toggle between a first role and a second role; and
   a randomizer circuit to cause a plurality of different, toggling frequencies to be applied to the multiple role toggling circuit to toggle the first transceiver between the first role for a first frequency and the second role for a second, different frequency.

10. The apparatus of claim 9, wherein the randomizer circuit is to cause a plurality of different, toggling duty cycles and the plurality of different, toggling frequencies to be applied to the multiple role toggling circuit.

11. The apparatus of claim 9, wherein the randomizer circuit is to cause each of a plurality of configuration channel pins of the serial bus receptacle to provide a role indicator from the multiple role toggling circuit.

12. The apparatus of claim 11, wherein the role indicator comprises an exposed pull-up resistor.

13. The apparatus of claim 9, wherein the first role and the second role of the first transceiver are data roles.

14. The apparatus of claim 9, wherein the first role and the second role of the first transceiver are power roles.

15. The apparatus of claim 9, wherein the first role and the second role of the first transceiver are power and data roles.

16. The apparatus of claim 9, wherein the randomizer circuit is to cause each of the plurality of different, toggling frequencies to be within a minimum toggling frequency and a maximum toggling frequency of a Universal Serial Bus (USB) specification.

17. An apparatus comprising:
    a serial bus receptacle to receive a serial bus plug of a device;
    a first transceiver electrically coupled to the serial bus receptacle;
    a multiple role toggling circuit to toggle the first transceiver between an upstream facing data port role and a downstream facing data port role, wherein the device comprises a second transceiver to toggle between an upstream facing data port role and a downstream facing data port role; and
    a randomizer circuit to cause a plurality of different, toggling duty cycles or a plurality of different, toggling frequencies to be applied to the multiple role toggling circuit to toggle the first transceiver between the upstream facing data port role for a first duty cycle or a first frequency and the downstream facing data port role for a second, different duty cycle or a second, different frequency.

18. The apparatus of claim 17, wherein the randomizer circuit is to cause each of a plurality of configuration channel pins of the serial bus receptacle to provide a role indicator from the multiple role toggling circuit.

19. The apparatus of claim 18, wherein the role indicator comprises an exposed pull-down resistor for the upstream facing data port role and an exposed pull-up resistor for the downstream facing data port role.

20. The apparatus of claim 17, wherein the randomizer circuit is to cause each of the plurality of different, toggling duty cycles to be applied within a minimum toggling duty cycle and a maximum toggling duty cycle of a Universal Serial Bus (USB) specification and each of the plurality of different, toggling frequencies to be applied within a minimum toggling frequency and a maximum toggling frequency of the USB specification.

21. An apparatus comprising:
- a serial bus receptacle to receive a serial bus plug of a device;
- a power supply electrically coupled to the serial bus receptacle;
- a multiple role toggling circuit to toggle the power supply between a power source role and a power sink role, wherein the device comprises a second power supply to toggle between a power source role and a power sink role; and
- a randomizer circuit to cause a plurality of different, toggling duty cycles or a plurality of different, toggling frequencies to be applied to the multiple role toggling circuit to toggle the power supply between the power source role for a first duty cycle or a first frequency and the power sink role for a second, different duty cycle or a second, different frequency.

22. The apparatus of claim 21, wherein the randomizer circuit is to cause each of a plurality of configuration channel pins of the serial bus receptacle to provide a role indicator from the multiple role toggling circuit.

23. The apparatus of claim 22, wherein the role indicator comprises an exposed pull-up resistor for the power source role and an exposed pull-down resistor for the power sink role.

24. The apparatus of claim 21, wherein the randomizer circuit is to cause each of the plurality of different, toggling duty cycles to be applied within a minimum toggling duty cycle and a maximum toggling duty cycle of a Universal Serial Bus (USB) specification and each of the plurality of different, toggling frequencies to be applied within a minimum toggling frequency and a maximum toggling frequency of a Universal Serial Bus (USB) specification.

* * * * *